United States Patent [19]

Gulick

[11] Patent Number: 5,805,845
[45] Date of Patent: Sep. 8, 1998

[54] METHOD FOR LOADING MEMORY WITH PROGRAM AND DATA INFORMATION FROM PC MEMORY ACROSS A BRIDGING BUS

[75] Inventor: Dale E. Gulick, Austin, Tex.

[73] Assignee: Advanced Micro Devices, Inc., Sunnyvale, Calif.

[21] Appl. No.: 731,852

[22] Filed: Oct. 21, 1996

[51] Int. Cl.$^6$ ...................................................... G06F 13/00
[52] U.S. Cl. ........................... 395/309; 395/306; 395/308
[58] Field of Search .................................... 395/308, 309, 395/306, 285, 286, 281, 291

[56] References Cited

U.S. PATENT DOCUMENTS

| 5,535,341 | 7/1996 | Shah et al. . |
| 5,649,161 | 7/1997 | Andrade et al. . |
| 5,659,718 | 8/1997 | Osman et al. . |
| 5,664,117 | 9/1997 | Shah et al. . |
| 5,694,556 | 12/1997 | Neal et al. . |

OTHER PUBLICATIONS

PCI Local Bus Multimedia Design Guide, Revision 1.0, Mar. 29, 1994, pp. 1–40.
Peripheral Components, Intel, 1995, pp. ix, 1–1 through 1–72.

Primary Examiner—Ayaz R. Sheikh
Assistant Examiner—Rupal D. Dharia
Attorney, Agent, or Firm—Conley, Rose & Tayon

[57] ABSTRACT

A method for transferring data between devices in a computer system, the computer system comprising a first bus, a bus bridge for coupling to the first bus and for interfacing to a second bus, a second bus coupled to the bus bridge, and a plurality of peripheral devices connected to the second bus. The method comprises activating a source port in the bus bridge to configure the source port in the bus bridge for a transfer. The bus bridge receives memory address and transfer size information from the first bus, and stores the memory address and transfer size information in a register of the source port. The memory address and transfer size information is indicative of a location and amount of data to be transmitted to a target peripheral device. The bus bridge transmits one or more command messages to a destination port of the target peripheral device. The one or more command messages includes an address of the destination port and the memory address and transfer size information received from the first bus. The transmitting is performed in response to storing the memory address and transfer size information in a buffer in the bus bridge. The target peripheral device receives the one or more command messages and executes an interrupt in response thereto. The target peripheral device activates a data port in response to execution of the interrupt. The source port in the bus bridge receives data from the first bus into a buffer in the source port, and the source port in the bus bridge transfers one or more address/data pairs across the second bus to the data port of the peripheral device in response to the source port receiving the data into the buffer. The one or more address/data pairs each includes an address of the data port in the target peripheral device and the data received from the first bus.

20 Claims, 34 Drawing Sheets

METHOD FOR LOADING MEMORY WITH PROGRAM AND DATA INFORMATION FROM PC MEMORY ACROSS A BRIDGING BUS

BACKGROUND OF THE INVENTION

1. Field of the Invention

The present invention relates to bus architectures, and more particularly to a bus bridge architecture for interconnecting a plurality of devices through bridge logic to a PCI bus.

2. Description of the Related Art

Personal computers are increasingly being used for multimedia and communication applications. Examples of multimedia applications include applications with audio and/or video presentation components. Examples of communication applications include e-mail clients, web browsing, and intranet access, among others.

A multimedia application which includes audio typically interfaces to an audio source and/or destination device. Audio sources which may need to be supported include television, radio, microphones, and compact disks, as well as telephony and modem applications. However, multimedia computers must do more than merely function as an audio switching unit from source to speakers and headphones. Multimedia computers must also provide the user the capability to manipulate the audio signals in an interactive fashion. Thus, it is desirable to provide a personal computer which can support music synthesizers, audio mixers, sound effects synthesizers, and the like, in addition to any associated stereo and mono codecs. Such functionality may be provided on a centralized audio chipset, which may receive signals from all audio sources.

It is frequently desirable to provide multiple audio and/or communication devices, and particularly telephony and modem devices, on an expansion card. However, most modem multimedia computers employ the Peripheral Component Interconnect (PCI) bus architecture. While the PCI bus accommodates expansion slots for add-in cards, each card is permitted to provide only one load on the bus. Accordingly, if multiple devices, such as multiple modems, are desired to be supported on a given expansion board, the devices must connect to a bus on-board the bridge device. A bridge device is required to interface between the devices connected to the on-board bus and the computer's expansion bus.

A variety of options is available for an on-board bus connecting to a computer expansion bus. A standard expansion bus, such as an Industry Standard Architecture (ISA), Extended Industry Standard Architecture (EISA) or Microchannel Architecture (MCA) may be employed. Bus bridges connecting each of these buses to a PCI bus are known. However, while such bus interconnections are an option, each of the above mentioned buses is an asynchronous bus requiring a bus master and relatively complex arbitration mechanism to support multiple devices. In addition, each of these bus standards is relatively slow. In time-critical isochronous functions, such as multimedia audio, this can introduce undesirable delays, both when the devices must communicate with one another and when they must communicate across the bus bridge on the PCI bus to the host computer. However, there is a large base of, for example, ISA bus compatible multimedia devices which could frustrate any move to a new standard. In addition, devices according to each of the above standards require a large number of pins to interface with the PCI bus.

Accordingly, there is a need for a more efficient bus bridge interconnect architecture for multimedia-related devices for interconnection and for interfacing to a standard bus, which also maintains support for an existing body of devices compatible with a previous standard and minimizes the number of pins required for connection. More particularly, there is a need for a bus mechanism for functionally coupling a plurality of multimedia devices to a PCI bus, while providing support for devices employing the ISA standard.

SUMMARY OF THE INVENTION

A computer system according to one embodiment of the present invention includes a central processing unit and a plurality of peripheral devices coupled to a first expansion bus employing a first transfer protocol. A bus bridge interfaces the first expansion bus to a second bus employing a second transfer protocol. A peripheral device compatible with the second transfer protocol is coupled to the second bus. Also coupled to the second bus is a peripheral device compatible with a peripheral bus standard employing a peripheral bus protocol that is different from the second transfer protocol. The bus bridge is operable to convert signals between the first expansion bus and the second bus, and is able to communicate with the peripheral devices on the second bus using their respective transfer protocols.

A computer system according to another embodiment includes a central processing unit, a bus bridge, and a plurality of peripheral devices coupled to a first bus employing a first transfer protocol. The bus bridge interfaces the first bus to a second bus, which employs a second transfer protocol. A plurality of peripheral devices compatible with the second transfer protocol are coupled to said second bus. The bus bridge communicates with the plurality of peripheral devices on the second bus in a round-robin ping-pong fashion. The bus bridge generates address/data pairs to a port on one of the peripheral devices, and thereafter receives address/data pairs from a port on the peripheral device. The bus bridge thereby generates and receives address/data pairs sequentially to ports in at least a subset of the peripheral devices in a round robin fashion.

The address/data pairs according to another embodiment of the present invention comprise an address which includes command/data information, data position information, and port address information. The data position information identifies a position of the corresponding data in the address/data pair.

A bus bridge according to one embodiment of the present invention includes a bus port for coupling to an expansion bus which implements a first transfer protocol compatible with the first bus port, and a second bus port for coupling to a second bus, which implements a second transfer protocol. The bus bridge is operable to implement the second transfer protocol on the second bus to communicate with one or more peripheral devices and is operable to implement a third transfer protocol on the second bus to communicate with one or more peripheral devices compatible with a third transfer protocol of a peripheral bus standard which is different from the second transfer protocol of the second bus. The bus bridge is further operable to time multiplex transfers using the second transfer protocol and the third transfer protocol on the second bus.

A variety of transfer methods according to the present invention are contemplated. A method of transferring data in a computer system using inherent flow control according to one embodiment of the present invention devices comprises activating a source port in a bus bridge to configure the source port in the bus bridge for a transfer. Next, an address identifying a destination port on one of a plurality of peripheral devices is received from the first bus and stored in a register in the source port. Once the address has been received, data that is to be transmitted to a peripheral device is received from the first bus, and stored in a buffer in the bus bridge. The data are transmitted to the peripheral device as one or more address/data pairs, each of which includes the address and the data received from the first bus.

A method of communicating in a computer system employing external inherent flow control comprises first activating a source port in a bus bridge to configure the source port a transfer. Next, an address identifying a destination port in a peripheral device is received from a first bus and is stored in a register of the source port. Data from the first bus that is to be transferred to a destination port of a peripheral device is stored in a buffer in the source port. The data are transmitted as one or more address/data pairs to the destination port. If the buffer in the bus bridge is substantially empty, and the target peripheral requires more data, it transmits a flow control command. A receive port in the bus bridge receives the flow control command, and the bus bridge retrieves data from memory in the computer system in response to the request. The requested data are transmitted as one or more address/data pairs to the destination port of the target peripheral device.

The present invention also contemplates two methods for generating interrupts in a computer system. The computer system comprises a first bus, a bus bridge for coupling to the first bus and for interfacing to a second bus, a second bus coupled to the bus bridge, and a plurality of peripheral devices connected to the second bus.

The first method generates interrupts to a peripheral device. Initially, a source port in the bus bridge is configured for a transfer. Next, an encoded interrupt vector is received from the first bus and is stored in a register of the source port. The encoded interrupt vector is indicative of one or more interrupt requests directed to a target peripheral device. An address/data pair containing the encoded interrupt vector is transmitted to a destination port of the peripheral device. Once received, the encoded interrupt vector is stored in a register of the destination port. Once the encoded interrupt vector is read, the peripheral device executes the appropriate interrupt routine.

The second method generates interrupts at a CPU. Initially, a destination port in the bus bridge is configured for a transfer. A digital signal processor in a source peripheral device next activates a source port in the source peripheral device. The source peripheral device transmits a command message as address/data pairs to the bus bridge responsive to said digital signal processor activating said source port. The bus bridge receiving the command message and sets a bit in a register responsive to receiving the command message. Finally, an interrupt is generated to the CPU in response to the setting of the bit.

A further embodiment of the present invention comprises a method for performing control transfers, such as, for example, register read and write operations. A first method comprises a bus bridge receiving and storing an address identifying a register in a target peripheral. Once the address is stored, the bus bridge transmits a command message to the target peripheral device including the target address. The bus bridge then receives and stores the data that is to be transmitted to the target peripheral in a buffer. The bus bridge transmits the data as one or more address/data pairs to a destination port of the target peripheral device. Other control transfers are handled similarly.

Yet another embodiment of the present invention provides a method for moving large blocks of data to and from memory. For example, a method for transferring data from a memory starts by activating a source port in a bus bridge to configure the source port for a transfer. Next, memory address and transfer size information is received from a device such as a main memory on a first bus, and is stored in a register of the source port. The memory address and transfer size information is indicative of a location and amount of data to be transmitted to a target peripheral device. A command message is then transmitted to a destination port of the target peripheral device. The command includes an address of the destination port and memory address and transfer size information. The target executes an interrupt in response to receiving the command, and activates a data port in response to the interrupt. The source port receives data from the first bus into a buffer and transfers it as one or more address/data pairs to a data port on the peripheral device. The address/data pairs each include an address of the data port received from the first bus.

BRIEF DESCRIPTION OF THE DRAWINGS

Other objects and advantages of the present invention will become apparent upon reading the following detailed description and upon reference to the accompanying drawings, in which.

Figure 1:
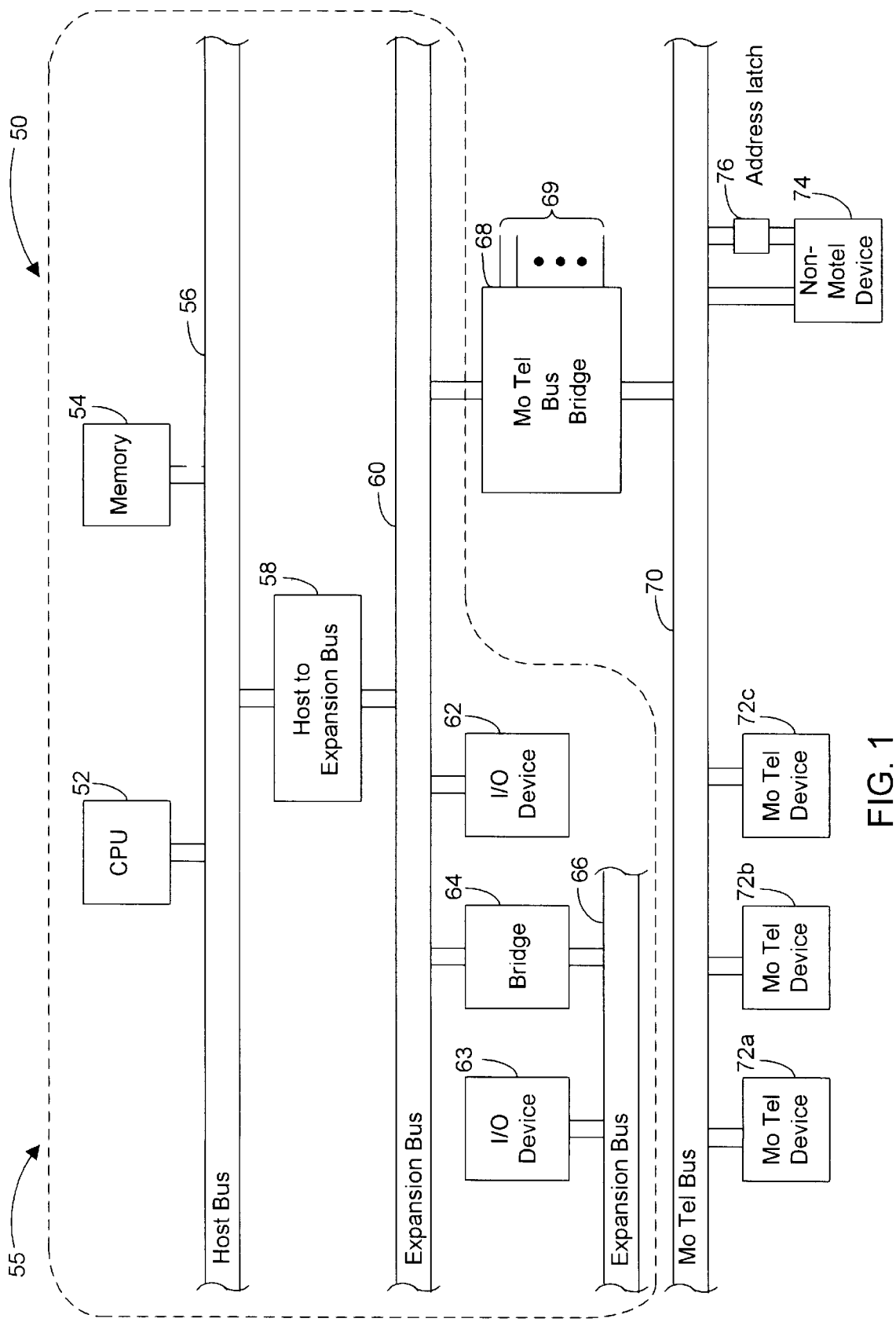
FIG. 1 is a block diagram of a computer system according to one embodiment of the present invention.

While the invention is susceptible to various modifications and alternative forms, specific embodiments thereof are shown by way of example in the drawings and will herein be described in detail. It should be understood, however, that the drawings and detailed descriptions thereto are not intended to limit the invention to the particular forms disclosed, but, on the contrary, the intention is to cover all modifications, equivalents, and alternatives falling within the spirit and scope of the present invention as defined by the appended claims.

DETAILED DESCRIPTION OF THE INVENTION

FIG. 1: Computer System

Turning now to the drawings, and with particular attention to FIG. 1, a computer system 50 configured to provide multimedia functionality according to the present invention is shown. A central processing unit (CPU) 52 and main memory 54 are coupled to the host bus 56. CPU 52 is any of a variety of processors, such as those implementing the x86, Pentium, Pentium Pro, MIPS, Alpha or PowerPC instruction sets. Host bus 56 in turn is coupled via a host-to-expansion bus bridge 58 to an expansion bus 60.

Expansion bus 60 may be any of a variety of commonly used expansion buses, including buses employing the Industry Standard Architecture (ISA), the Extended Industry Standard Architecture (EISA), the Microchannel Architecture (MCA), and the Peripheral Component Interconnect (PCI) architecture bus transfer protocols. In a preferred embodiment, expansion bus 60 is a PCI bus employing the PCI bus transfer protocol. In this embodiment, bus bridge 58 includes PCI bridge logic. For example, the bus bridge 58 comprises the Triton chipset available from Intel Corporation.

One or more I/O devices 62 are coupled to expansion bus 60. Computer system 50 further includes another expansion bus 66 coupled to expansion bus 60 by way of a bus bridge 64. The expansion bus 66 is preferably a legacy expansion bus for backwards compatibility with older expansion cards. One or more I/O devices 63 are coupled to expansion bus 66. Again, expansion bus 66 is any of a variety of expansion bus standards, and preferably is an ISA bus.

MoTel Bus bridge 68 couples to expansion bus 60. The MoTel Bus bridge 68 is provided for interfacing to MoTel Bus 70 and is operable to convert signals between the two buses. MoTel Bus bridge 68 includes a variety of functional modules, including for example, a digital synthesizer, an audio mixer, an audio effects unit, and various codecs. In addition, MoTel Bus bridge 68 includes a variety of input and output ports 69. For example, MoTel bus bridge 68 may be coupled to receive inputs from a variety of audio sources, including CD, radio, microphone and the like. MoTel Bus bridge 68 may further be coupled to provide audio outputs to, for example, telephone lines or speakers.

A variety of peripheral devices 72a through 72c are coupled to MoTel Bus 70, which employs a unique transfer protocol. Motel Bus devices 72a through 72c (i.e., those compatible with the MoTel bus protocol) provide various telephony and/or communication functions, including modem, speaker phones, answering machine, 3D audio and DSVD. In addition, a peripheral device 74 compatible with another transfer protocol (a "non-MoTel Bus device"), such as an Am79C30A digital subscriber control unit compatible with the ISA bus transfer protocol, is coupled to MoTel Bus 70. Thus, MoTel bus bridge 68 is operable to implement two transfer protocols on the MoTel bus 70. A logic circuit 76, preferably an address latch, intercouples the non-MoTel device 74 to the MoTel Bus 70. Logic circuit 76 is used to capture addresses to provide compatibility with ISA bus protocols.

As will be discussed in more detail below, when the MoTel bus bridge 68 communicates with an ISA device, it employs standard ISA bus protocols, except that the address and data are multiplexed. The latch serves to "capture" the address; in alternate non-multiplexed embodiments, the logic circuit is not necessary, though extra pins on the MoTel Bus bridge are required. It is noted that while one particular computer system is illustrated in FIG. 1, a variety of other configurations are contemplated. For example, MoTel bus bridge 68, Motel bus 70, and the MoTel and non-MoTel bus devices 72a–72d may be comprised on an adapter card. Thus, FIG. 1 is exemplary only.

Figure 2:
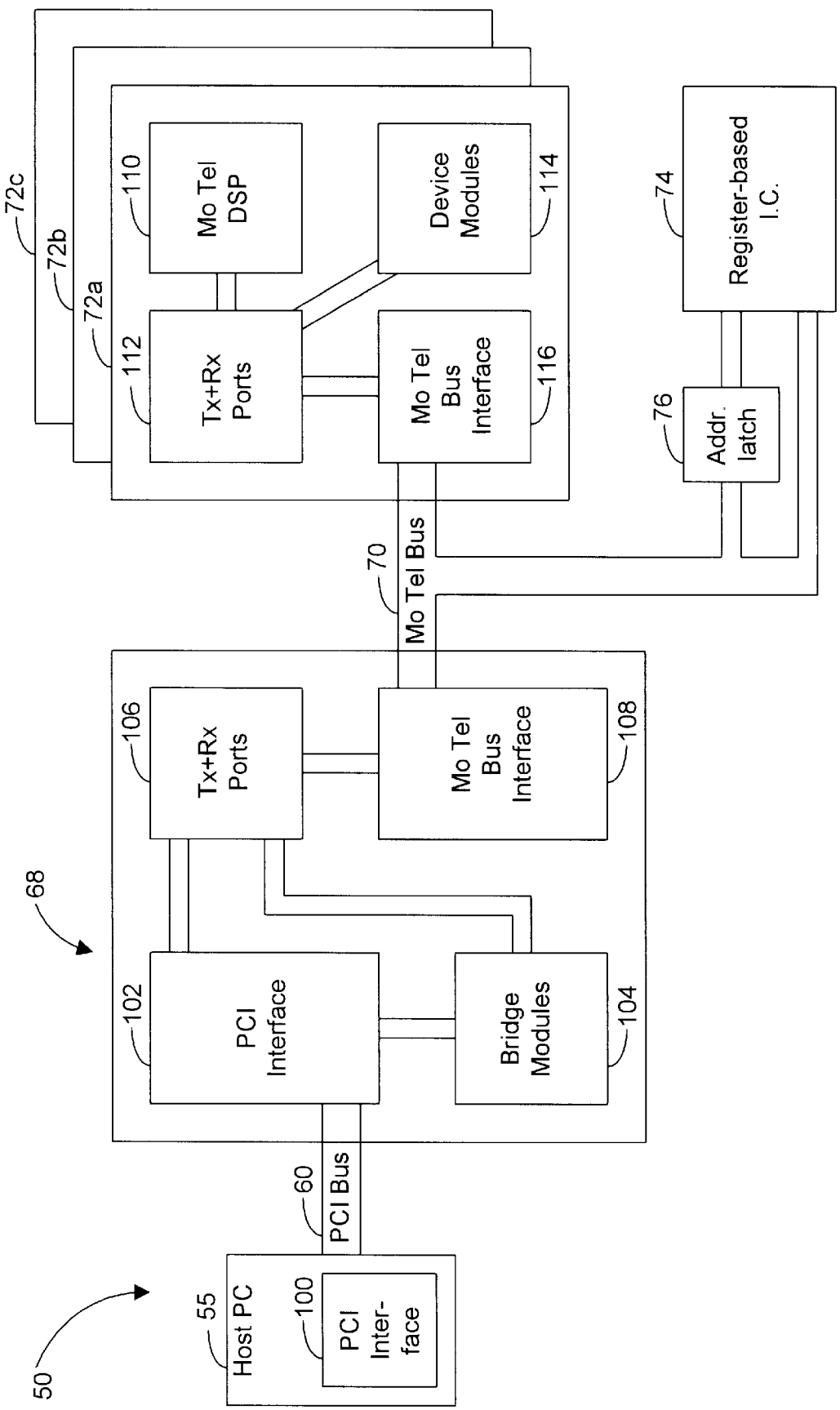
FIG. 2 is a more detailed block diagram showing the MoTel telephony bus system according to one embodiment of the present invention.

FIG. 2 —MoTel Bus System

Turning now to FIG. 2, the MoTel Bus system is shown in greater detail. MoTel Bus bridge 68, MoTel Bus devices 72a through 72c employing the MoTel bus transfer protocol, and a non-MoTel Bus device 74 employing a non-MoTel bus transfer protocol, such as an ISA bus transfer protocol, and logic circuit or address latch 76 are coupled to MoTel Bus 70. In a preferred embodiment, host PC 55 includes a PCI interface 100 coupled to a PCI bus 60, which in turn is coupled to a PCI interface 102 on MoTel Bus bridge 68. MoTel Bus bridge 68 further includes a plurality of bus bridge ports 106. The bus bridge ports comprise transmit and receive ports, a predetermined number of which are configured to be selectively activated at a given time.

The MoTel bus bridge further includes a plurality of functional modules 104. The functional modules 104 include multimedia codecs, synthesizers, mixers, and various other audio units. MoTel Bus interface 108 couples MoTel Bus bridge 68 to MoTel Bus 70. MoTel Bus 70 in turn is coupled to a MoTel Bus interface 116 on each MoTel Bus device 72a through 72c.

Each MoTel Bus device 72a through 72c includes a plurality of peripheral device ports 112 comprising transmit and receive ports, one or more functional modules or units 114 and a MoTel digital signal processor (DSP) 110. MoTel Bus 70 according to one embodiment supports up to four devices. All four devices may be MoTel Bus devices. In the alternative, one of the four devices may be a non-MoTel Bus device 74. In one embodiment, the interface between non-MoTel Bus device 74 and the MoTel Bus includes an address latch 76. It is noted, however, that with the addition of relatively simple circuitry, more than one non-MoTel Bus device may be supported on the MoTel Bus 70.

Data transfer between the MoTel Bus bridge 68 and the MoTel Bus devices 72a through 72c is via a set of logical "pipes" overlaid on the physical structure of "ports" at each end of the interface bus. In one embodiment there are up to 62 ports (31 transmit, 31 receive) per device. Each port includes a data buffer and a control mechanism, and is dedicated to a specific function. The physical address of the port comprises five bits of an eight-bit address portion of the MoTel Bus cycle, as will be discussed in more detail below. The pipes are half-duplex logical structures, four types of which exist: Transport, control, interrupt request and memory move. Particulars of each type of pipe will be discussed in detail below.

Figure 3:
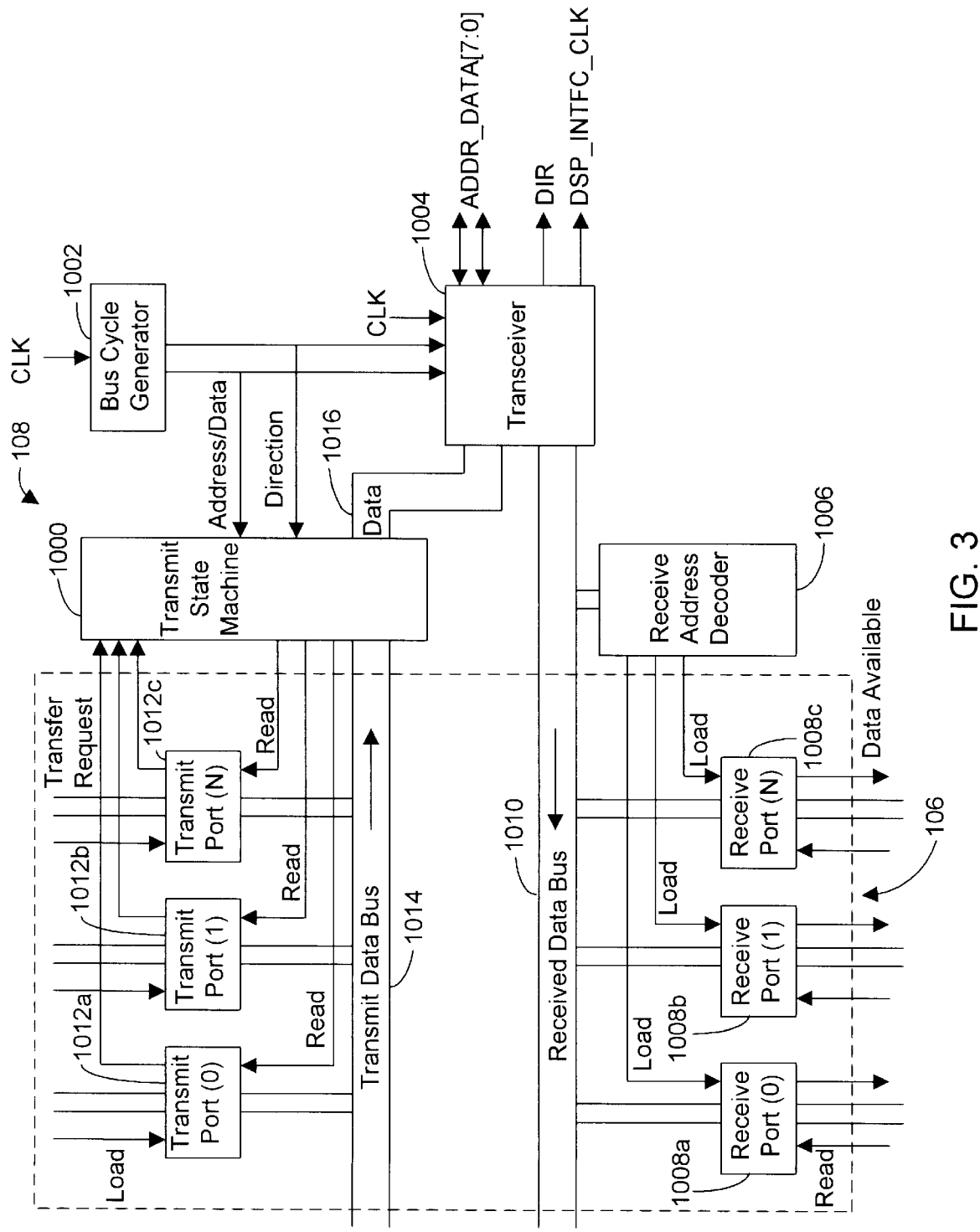
FIG. 3 is a block diagram of a modem telephony bus interface according to one embodiment of the present invention.

FIG. 3: Transmit and Receive Ports

Turning now to FIG. 3, the MoTel Bus interface 108 and transmit and receive ports 106 of MoTel Bus interface 68 are shown in greater detail. MoTel Bus interface 108 includes a transmit state machine 1000, a bus cycle generator 1002, a transceiver 1004, and a receive address decoder 1006.

Transmit port state machine 1000 arbitrates between the various transmit port requests for transfer cycles and identifies, for example, the destination port address of the destination port which is to receive the data. As will be discussed in more detail below, the system operates on a round-robin basis with each requesting port being granted a single transfer cycle before the transmit state machine 1000 gives control to the next requesting port for its single cycle. The transmit state machine 1000 skips over ports that do not have their transfer request signals active. Prior to each cycle, the transmit state machine 1000 selects the next port with an active transfer request signal. If no ports have their transfer request lines active, the transmit state machine 1000 generates and transmits an "idle" message which has zeroes (0s) in all bits of both the address and data fields.

Receive address decoder 1006 decodes the address field of the receive data address pair and passes command data and data position fields to the addressed port along with the data byte and load strobe. The bus cycle generator 1002 creates the basic timing for the interface bus including the bus direction signal and the basic data clock. Data transfers are made synchronous to the rising edge of the data clock DSP_INTFC_CLK which typically runs at 2 MHz. The direction signal is a divide-by-two of the data clock DSP_INTFC_CLK. The transceiver 1004 interfaces the DSP interface module to the MoTel Bus bridge's pins and the bi-directional off-chip interface bus gets converted to and from the separate internal transmit and receive buses.

Bus cycle generator 1002 receives a clock signal, generates a direction signal, which is provided to transmit state machine 1000 and transceiver 1004, and an address data control signal, which is also provided to transmit state machine 1000 and transceiver 1004. Transmit state machine 1000 reads the data that is to be transmitted from the transmit port buffers and provides the data via internal data bus 1016 to transceiver 1004. Transceiver 1004 provides the MoTel bus signals and transmits and receives the relevant data. Receive address decoder 1006 is coupled to receive data bus 1010 and serves to decode the incoming address on receive cycles and provide a load signal to the appropriate receive port 1008a through 1008n.

The receive ports 1008a through 1008n each include a data buffer and a port state machine and associated control registers. On a data receive cycle, the transceiver provides an address and data byte on receive data bus 1010. Receive address decoder 1006 reads the address and generates a control load signal to the appropriate receive port. The port state machine reads the data off the bus into the buffer. When the buffer is full, the port state machine signals that data is available to be read and provides the data responsive to a read signal received from the host PC via the PCI interface.

The transmit ports 1012a through 1012n function in a similar fashion and similarly include data buffers, control registers and port state machines. Data are provided to a transmit port selected by a load signal via an internal MoTel Bus bridge address data bus. When the port buffer is full, the transmit port state machine signals a transfer request to transmit state machine 1000. Transmit state machine 1000 signals a read of the buffer in response thereto. The transmit port state machine transmits the data along transmit data bus 1014 to the transmit state machine 1000, which in turn provides the data along data bus 1016 to transceiver 1004, which provides the data onto the MoTel Bus.

The MoTel Bus employs a "master/slave" clocking relationship, but a "multiple master" data flow relationship. The bus bridge 68 controls the clocking and provides the MoTel Bus clock, MOTEL_BUS_CLK. However, the basic bus cycle uses a multiplexed "ping-pong structure." The MoTel Bus 70 employs an 8 bit multiplexed structure supported by three clock signals and several non-multiplexed signals. The bus runs at a maximum of about 30 MHz and preferably at about 20 MHz. The bus signals employed by the MoTel Bus are shown in Table 1:

TABLE 1

MoTel Bus Signals

| Signal | Description |
|---|---|
| ADDR_DATA [7:0] | Multiplexed address and data destined from the selected target device |
| MOTEL_BUS_CLK | Master clock (approx. 20 MHz) |
| DIR-AEN | Bus Direction transmit from MoTel Bus Bridge and Address Latch Enable for the non-MoTel Bus device |
| TARGET_ADDR[1:0] | Selects on of four target devices. Address for non-MoTel Bus device |
| CS/ | Chip Select for non-MoTel Bus device |
| RD/ | Read Strobe for non-MoTel Bus device |
| WR/ | Write Strobe for non-MoTel Bus device |
| INTREQ | Interrupt request from non-MoTel Bus device |

Figure 4:
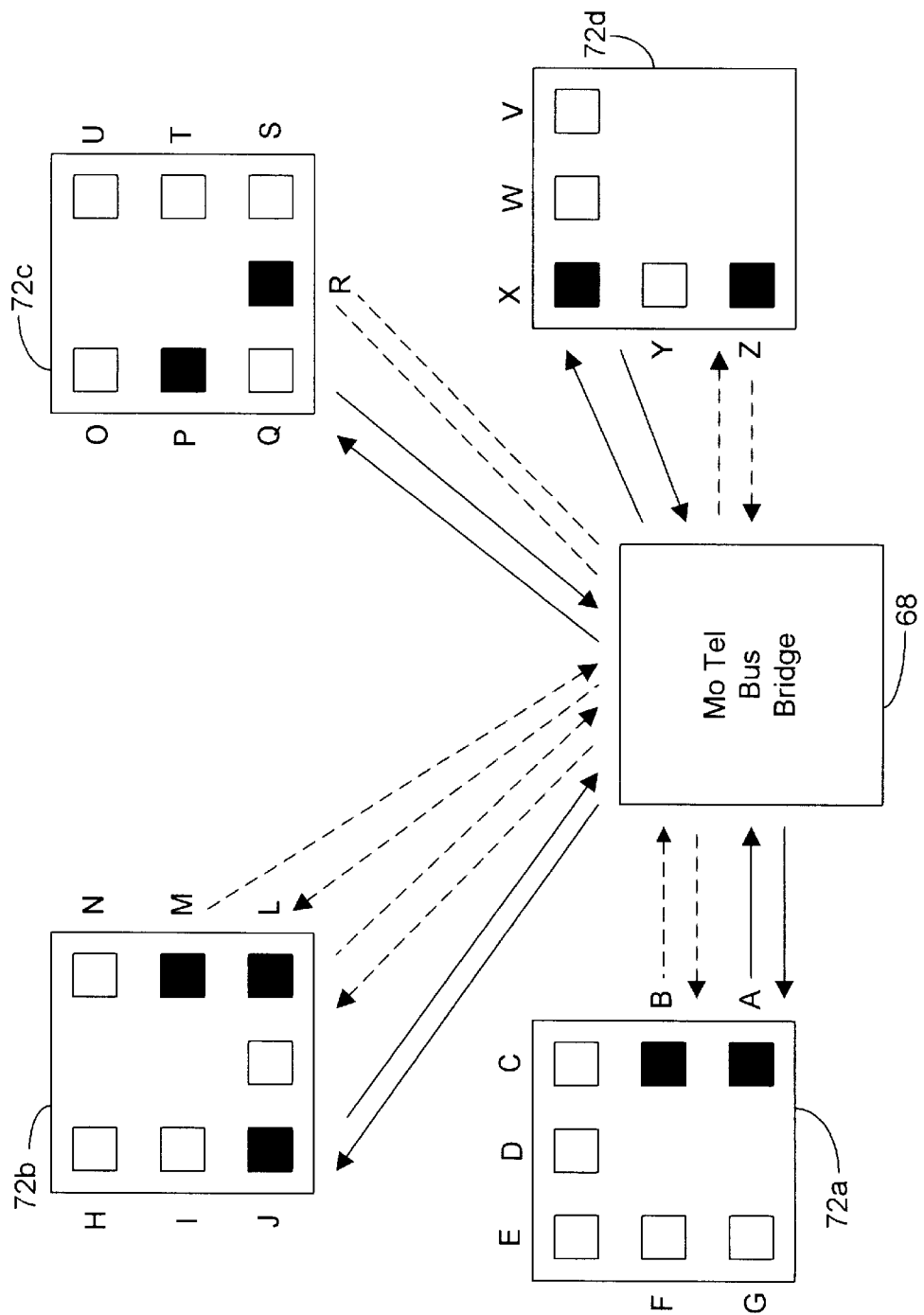
FIG. 4 is an illustration showing the communication mechanism between the modem telephony bus bridge and modem telephony bus compatible devices according to one embodiment of the present invention.
Figure 5:
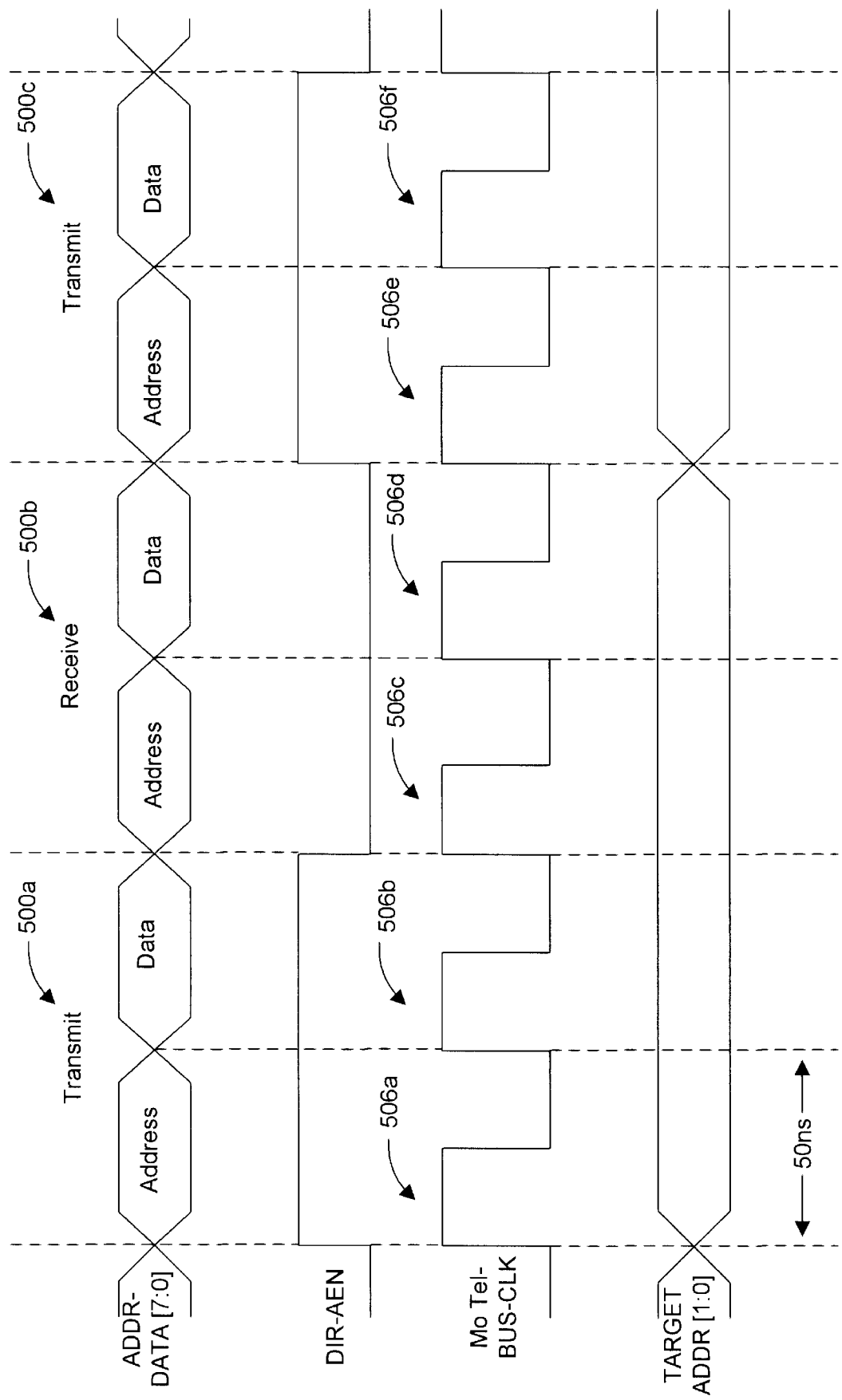
FIG. 5 illustrates a timing diagram showing the communication between the modem telephony bus bridge and modem telephony bus compatible devices according to one embodiment of the present invention.

FIGS. 4 and 5: Timing and Arbitration

FIGS. 4 and 5 illustrate the basic timing and arbitration mechanism of the MoTel Bus 70 when no non-MoTel Bus devices are supported. Turning now to FIG. 4, MoTel Bus bridge 68 communicates via a ping-pong sequential round-robin scheme with each active port on the MoTel Bus peripheral devices 72a through 72d. MoTel Bus device 72a includes ports A through G, of which ports A and B are illustrated as being active. MoTel Bus device 72b includes ports H through N, of which ports J, L and M are illustrated as being active. MoTel Bus device 72c includes ports O through U, of which ports P and R are illustrated as being active. Finally, MoTel Bus device 72d includes ports V through Z, of which ports X and Z are illustrated as being active. The number of ports shown in FIG. 4 is exemplary only. As discussed above, each MoTel Bus device 72a through 72d can include up to 62 ports. MoTel Bus bridge 68 communicates only with active ports, beginning with port A on MoTel Bus device 72a. During the first half of the bus cycle, it transmits an address/data pair to port A; during the second half of the bus cycle, MoTel Bus bridge 68 receives an address/data pair from the port A.

Once the device has been serviced, the bus bridge 68 communicates this transmit/receive cycle with the next active port on the next MoTel Bus device having an activated port. Thus, in FIG. 4, once port A has been serviced, port J on MoTel Bus device 72b is serviced. Once port J is serviced, port Q on MoTel Bus device 72c is serviced; after that, port X on MoTel Bus device 72d is serviced. Once each device has been serviced, the bus bridge returns to the first device and services the next active port in round-robin fashion. Thus, for the next pass through the four MoTel Bus devices, the following ports are serviced: B, L, R, and Z. This process will continue for as long as the ports are active. For the next round, the following ports is serviced: A, M, P, and X. If a port goes inactive it will not be serviced by the bus. As new ports are activated, they are inserted into the round-robin scheme. The order of activation of the ports within each device is dependent on an arbitration mechanism on the device itself; the bus services the active ports as described above independently of the mechanism used internally within the devices. The activation of ports in the bus bridge is similar, except that the bus bridge is the master and manages the processes to and from the bus bridge.

Turning now to FIG. 5, the basic timing for communication between the MoTel Bus bridge 68 and MoTel Bus devices is shown. As discussed above, the MoTel Bus bridge 68 provides a MoTel Bus clock signal MOTEL_BUS_CLK, preferably having a 50 nanosecond cycle. The MoTel Bus bridge 68 identifies a target address which is active during the bus cycle 500a, 500b, 500c, and identifies the particular bus device selected. During the first half of each MoTel Bus cycle 500a, 500b 500c the direction address enable signal, DIR-AEN, is active, indicating that the MoTel Bus bridge 68 is transmitting to first MoTel Bus device, 72a, for example. During MoTel Bus clock cycle 506a, MOTEL_BUS_CLK (the first half of the MoTel Bus cycle), the address data signal, ADDR_DATA[7:0], is the address of a port of a particular MoTel Bus device. During the next MoTel Bus clock cycle 506b (the second half of the MoTel Bus cycle), while the direction address enable signal, DIR-AEN, is still active, a data byte is transmitted. Substantially immediately after the initial address and data byte have been transmitted, the direction address enable signal, DIR-AEN, will go inactive, changing the direction of signals on the bus. During the next MoTel Bus clock cycle 500c, the MoTel Bus device 72 transmits an address of the port on the MoTel Bus bridge 68. On the next MoTel Bus clock cycle 506d, the MoTel Bus device 72 transmits a data byte to the MoTel Bus bridge 68. During the next MoTel Bus clock cycle, bus mastership is returned to the MoTel Bus bridge 68, which transmits an address of a port on the next MoTel Bus device (the direction address enable signal DIR-AEN once again going active) and the bus cycle proceeds as described above.

Figure 6:
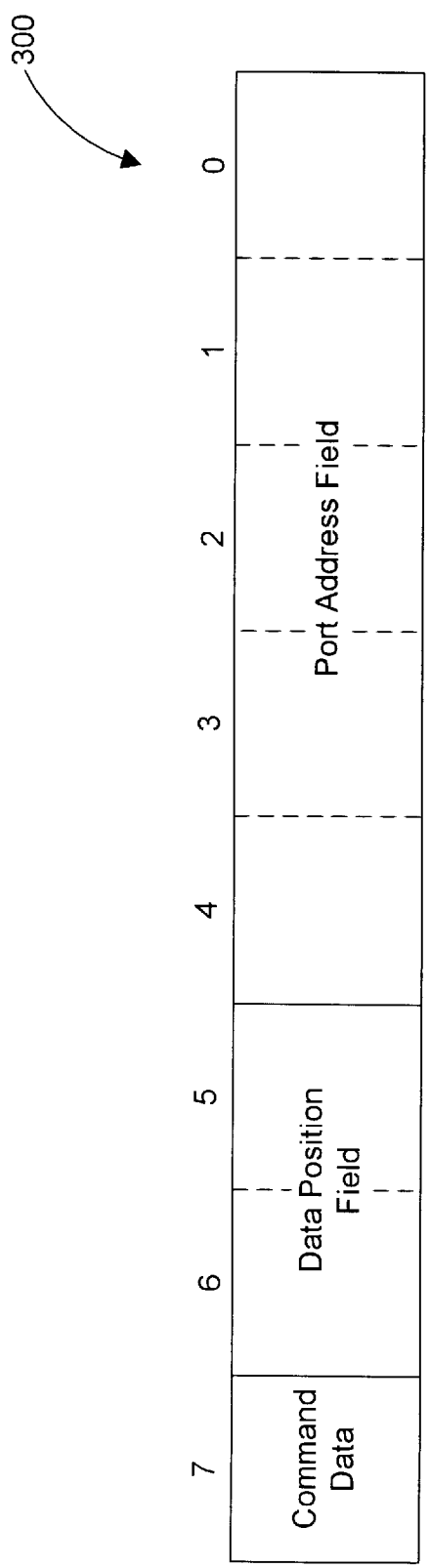
FIG. 6 is a diagram illustrating the interface bus address field according to one embodiment of the present invention.

FIG. 6: Interface Bus Address Field

As noted above, the basic MoTel bus cycle comprises the transmission of an address/data pair from the MoTel Bus bridge to the MoTel Bus device followed by a pair from the MoTel Bus device to the MoTel Bus bridge. The address byte 300 comprises a one-bit command/data flag 302, a two-bit data position field 304, and a five-bit port address field 306, as shown in FIG. 6. The data position field identifies position of the data in the address/data pair. Preferably, the data position field identifies the data byte as being the first byte in a packet, the last byte in a packet or a byte in-between the beginning and the end, as set forth in Table 2 below:

TABLE 2

Data Position Field

| Bit | Definition |
|---|---|
| 0 0 | Start |
| 0 1 | Mid |
| 1 0 | Reserved |
| 1 1 | End |

Figure 7:
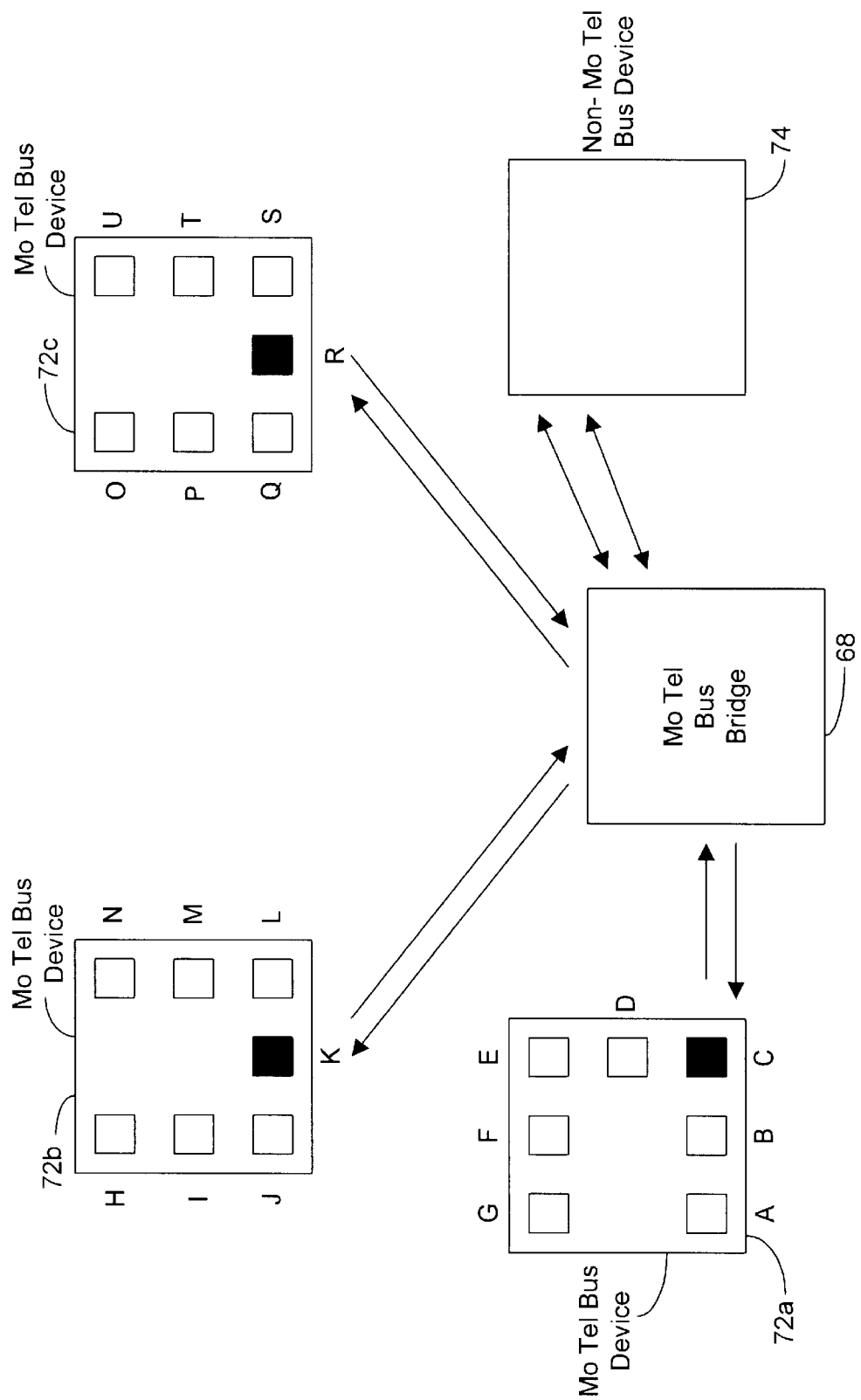
FIG. 7 is a diagram illustrating the communication between the modem telephony bus bridge and a plurality of modem telephony bus devices as well as a non-modem telephony bus device according to one embodiment of the present invention.
Figure 8:
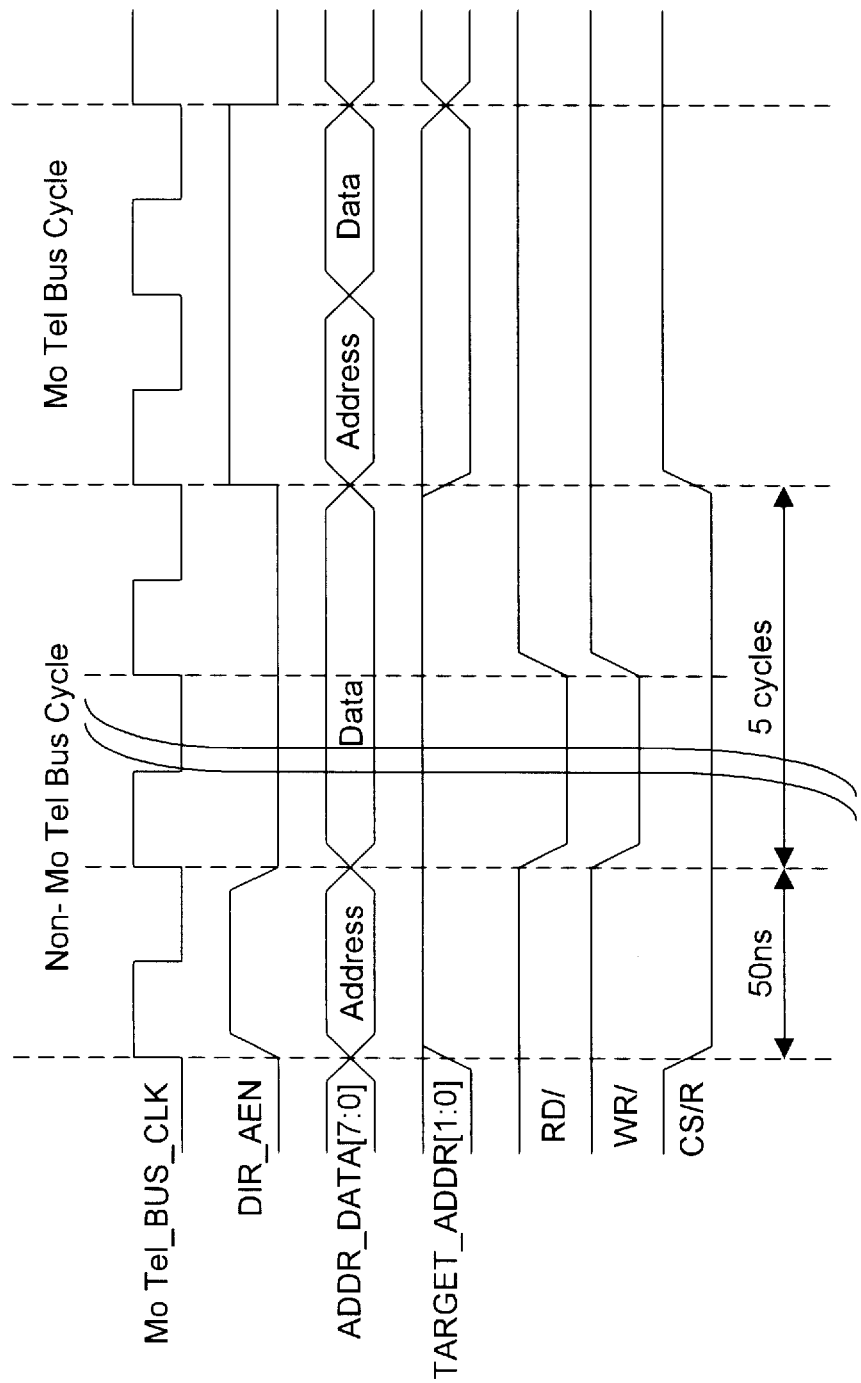
FIG. 8 is a timing diagram illustrating communication over the modem telephony interface bus with a non-modem telephony interface bus compatible device according to one embodiment of the present invention.

FIGS. 7 and 8: Non-MoTel Bus Arbitration and Timing

Transfers to and from the non-MoTel Bus device or devices that may be supported on the MoTel Bus proceed somewhat differently than transfers to and from MoTel Bus devices. For example, the non-MoTel Bus device 74 preferably cannot be a bus master. FIGS. 7 and 8 illustrate bus arbitration and timing for time-multiplexed transfers using the MoTel bus and the ISA bus standard protocols for configurations including a non-MoTel ISA Bus device. Non-MoTel Bus device 74 is preferably an ISA-type device. With particular attention to FIG. 7, MoTel Bus bridge 68 is coupled to MoTel Bus devices 72a through 72c, and a non-MoTel Bus device 74. MoTel Bus device 72a includes ports A through G, of which port C is illustrated as being active. MoTel Bus device 72b includes ports H through N, of which port K is illustrated as being active. MoTel Bus device 72c includes ports O through U, of which port R is illustrated as being active. Access to the MoTel Bus devices 72a through 72c proceeds in a manner similar to that described above with respect to FIG. 4. When the round-robin scheme reaches non-MoTel Bus device 74, however, the bus stops generating MoTel Bus cycles and instead generates a cycle that is supported by and directed at the non-MoTel Bus device (preferably ISA-like cycles). Once the non-MoTel Bus cycle has completed, the bus bridge returns to generating MoTel Bus cycles.

For example, in FIG. 7, bus access proceeds as follows: MoTel Bus cycles are generated between the MoTel Bus bridge 68 and port C on MoTel Bus device 72a, followed by port K on MoTel Bus device 72b, followed by port R on MoTel Bus device 72c. Once port R has been serviced, the bus bridge generates a non-MoTel Bus cycle to service device 74. Once the ISA-like cycle has been completed, the bus again returns to service port C on device 72a (assuming it is still active).

Turning now to FIG. 8, a timing diagram illustrating the handling of bus access in a system including a non-MoTel Bus device is shown. MoTel Bus cycles 550a and 550b to MoTel bus devices are handled in the manner described above. In the example illustrated, the non-MoTel bus protocol is an ISA protocol, but with a multiplexed address and data. Thus, the address latch is employed to read the address from the multiplexed data stream. It is noted that the latch could be eliminated if a non-multiplexed configuration requiring extra pins on the MoTel Bus bridge were to be employed. During the non-MoTel Bus cycle, the read RD/, write WR/ and chip select CS/ strobes are used in a well known manner. More particularly, the non-MoTel Bus device is selected with the TARGET_ADDR[1:0] signal. At the same time, the CS/ goes active and the address is latched. The RD/ or WR/ strobes go active a half cycle later. When the ISA cycle is completed, the CS/ goes inactive and the ADDR_DATA[7.0] selects the next device.

More particularly, ISA read, write and interrupt operations are supported, with the bus supporting a 256 byte address space and an 8-but data bus. During a write operation to a register within the non-MoTel Bus device, the host performs a write to one of the 256 address locations within the MoTel Bus bridge's write port, which is a single data register mapped at all 256 address locations. The write port captures the data in addition to the address. The MoTel bus generates a write to the target on the next non-Motel bus cycle.

The ISA-like read operation is handled similarly. A read from a register within the non-Motel bus device is initiated by an 8-bit read at one of the 256 address locations within the read port of the MoTel bus bridge. The read port, like the write port, is a single data register mapped at all 256 address locations. Once the read port captures the address to be read, the MoTel Bus generates a read cycle to the target using the captured address. The data to be read is returned to the MoTel Bus bridge, where it is provided to the host as the conclusion of the of the original read operation. Thus, the host waits to receive the data while the read port waits for an available MoTel Bus cycle. This can take up to 300 ns longer than a standard ISA cycle timing. It is noted that in an alternate embodiment, in which all targets require longer than a single ISA timed cycle to respond, a READY signal may be provided.

For non-MoTel bus (ISA-type) interrupts, a pin (INTREQ) is provided to operably couple the non-MoTel bus device interrupt request line to the host PC's interrupt controller. More particularly, the interrupt request line from the non-MoTel bus device is connected to the INTREQ input of the MoTel bus bridge. From there, it is routed to the PCI interface for mapping to one of the PCI bus interrupt lines. A mask capability is preferably provided within the MoTel bus bridge.

Data Pipes

As discussed above, the basic function of the MoTel Bus DSP interface module is to move control, status, interrupt, and content data between the MoTel DSP and either the MoTel Bus bridge or the host PC. Some pipes use only a transmit port, in which case the address can also be used for a completely separate receive-only style pipe. Pipe structures which require both a transmit port and a receive port can send the address in both directions. The ports on the MoTel Bus bridge are set forth in Table 3 below:

TABLE 3

| PORT | BIT 4 3 2 1 0 | Tx, Rx | TYPE OF PIPE |
| --- | --- | --- | --- |
| IDLE | 0 0 0 0 0 | NA | None |
| Tel. DAA to MoTel Bus device | 0 0 0 0 1 | Tx | Transport |
| Modem Tx data to tel. DAA | 0 0 0 1 0 | Rx, Tx | Transport |
| Modem Tx data to MoTel Bus device | 0 0 0 0 1 | Tx | Transport |
| Modem echo to MoTel Bus device | 0 0 1 0 0 | Tx | Transport |
| MM codec A/D to MoTel Bus device Left | 0 0 1 0 1 | Tx | Transport |
| MM codec A/D to MoTel Bus device Right | 0 0 0 1 0 | Tx | Transport |
| MM codec data from MoTel Bus device Left | 0 0 1 1 1 | Rx, Tx | Transport |
| MM codec data from MoTel Bus device Right | 0 1 0 0 0 | Rx, Tx | Transport |
| 3D to MoTel Bus channel 0 | 0 1 0 0 1 | Tx | Transport |
| 3D to MoTel Bus channel 1 | 0 1 0 1 0 | Tx | Transport |
| 3D to MoTel Bus channel 2 | 0 1 0 1 1 | Tx | Transport |
| 3D to MoTel Bus channel 3 | 0 1 1 0 0 | Tx | Transport |
| 3D to MoTel Bus channel 4 | 0 1 1 0 1 | Tx | Transport |
| 3D to MoTel Bus channel 5 | 0 1 1 1 0 | Tx | Transport |
| 3D to MoTel Bus channel 6 | 0 1 1 1 1 | Tx | Transport |
| 3D to MoTel Bus channel 7 | 1 0 0 0 0 | Tx | Transport |
| 3D from MoTel Bus Left | 1 0 0 0 1 | Rx, Tx | Transport |
| 3D from MoTel Bus Right | 1 0 0 1 0 | Rx, Tx | Transport |
| PC to MoTel Bus general transport | 1 0 0 1 1 | Tx | Transport |
| MoTel Bus status read by MoTel Bus Bridge | 1 0 1 0 0 | Tx, Rx | Control |
| MoTel Bus Bridge read by MoTel Bus | 1 0 1 0 1 | Rx, Tx | Control |
| Write of MoTel Bus reg. by PC | 1 0 1 1 0 | Tx | Control |
| MoTel Bus memory load by PC | 1 0 1 1 1 | Tx | Memory Move |
| MoTel Bus memory dump to PC | 1 1 0 0 0 | Rx, Tx | Memory Move |
| Interrupt to MoTel Bus | 1 1 0 0 1 | Tx | Interrupt |
| Reserved | 1 1 0 1 0 | * | |
| Reserved | 1 1 0 1 1 | * | |

TABLE 3-continued

| PORT | BIT 4 3 2 1 0 | Tx, Rx | TYPE OF PIPE |
|---|---|---|---|
| Reserved | 1 1 1 0 0 | * | |
| Reserved | 1 1 1 0 1 | * | |
| Reserved | 1 1 1 1 0 | * | |
| Reserved | 1 1 1 1 1 | * | |
| Modem Rx data to PC | 0 0 0 0 1 | Rx | Transport |
| Modem echo from MoTel Bus | 0 0 0 1 1 | Rx | Transport |
| Write of a MoTel Bus Bridge from Motel Bus | 0 0 1 0 0 | Rx | Control |
| Interrupt to PC from MoTel Bus | 0 0 1 0 1 | Rx | Interrupt |
| Reserved (Must pair with a Tx only) | | Rx | |

*Can be a Tx or a Tx/Rx (Rx only port types should be overlaid on top of Tx only ports).

As noted above, the various ports support four types of pipes. Operation of each type of pipe is described within the context of the supporting ports.

Interrupt Pipes

Figure 9:
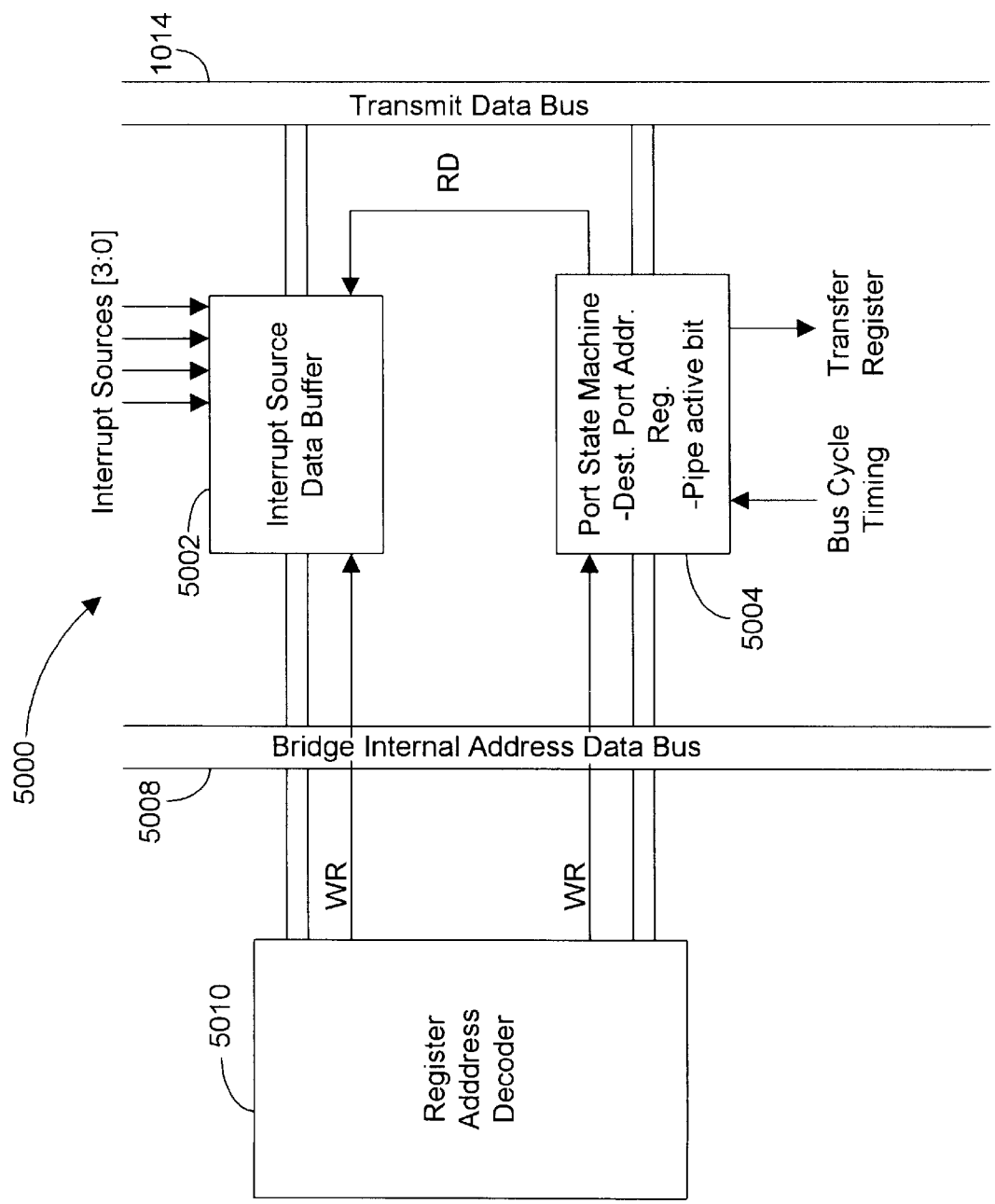
FIG. 9 is a block diagram illustrating the transmit port used to interrupt a modem telephony bus compatible device according to one embodiment of the present invention.
Figure 10:
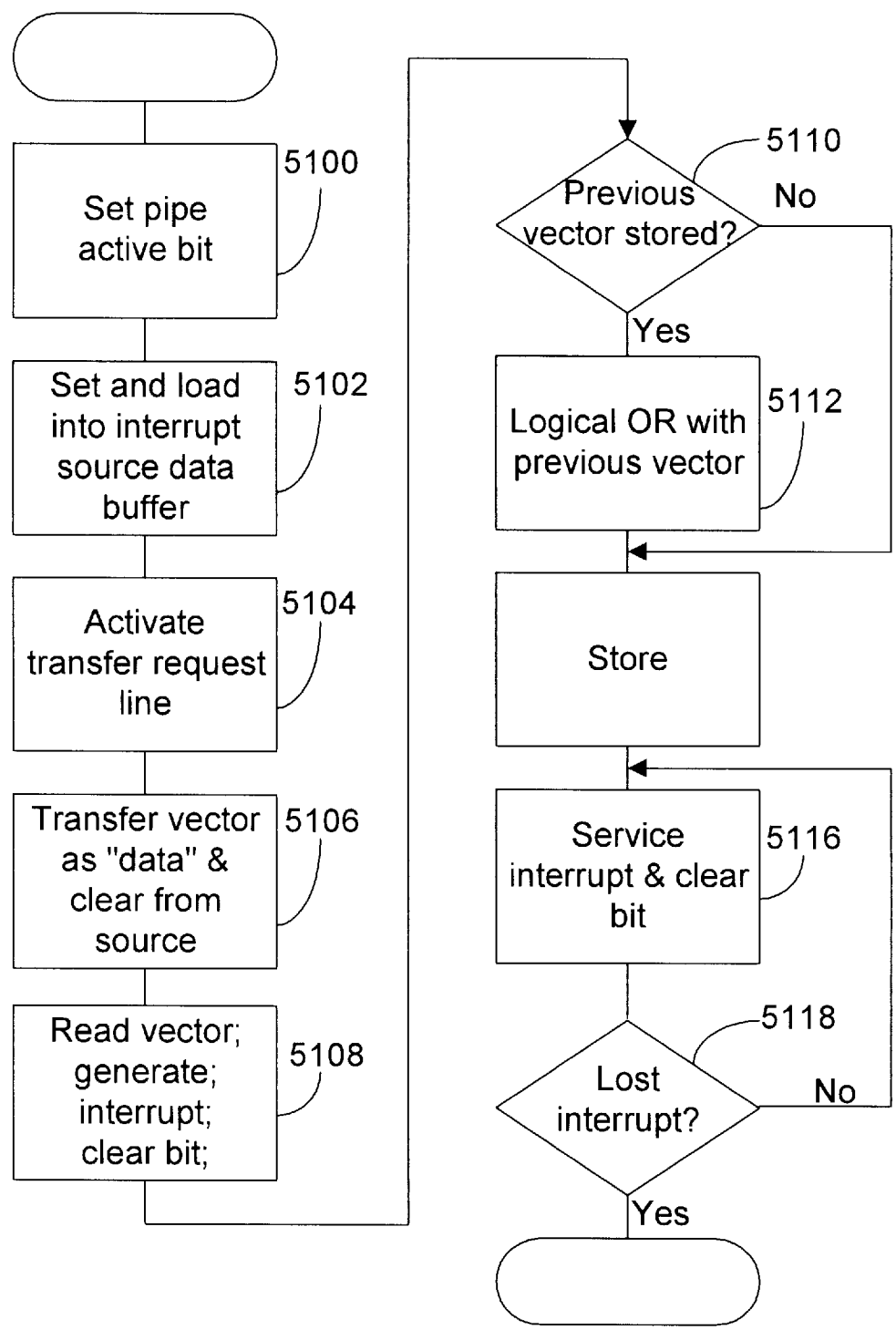
FIG. 10 is a flowchart illustrating the interrupt request process of a MoTel bus device according to one embodiment of the present invention.

FIGS. 9 and 10: PC Interrupt of MoTel Bus Device

Turning now to FIG. 9, a block diagram of the transmit port used by the host PC 55 to interrupt a MoTel Bus device 72a through 72c is shown. The interrupt request port includes an interrupt source data buffer 5002 coupled to port state machine 5004. Interrupt source data buffer 5002 and port state machine 5004 are also each coupled to transmit data bus 1014, internal address data bus 5008, and register address decoder 5010.

Turning now to FIG. 10, a flowchart of the interrupt request process is shown. Initially, the pipe is inactive. The host PC activates the pipe by activating a source port in the bus bridge. This preferably is accomplished by setting the pipe active bit in a register in the port state machine (Step 5100).

After the pipe has been activated, the bus bridge receives an encoded interrupt vector which is indicative, for example, of one or more interrupts to the target peripheral or MoTel bus device. The bus bridge preferably stores the encoded interrupt vector in a register in the source port. More particularly, setting a desired interrupt bit loads the data into the interrupt source data buffer 5002 (Step 5102).

After the bus bridge loads the encoded interrupt vector into the buffer, the bus bridge transmits an address/data pair to a destination port in the MoTel bus device. This is preferably accomplished through the port state machine 5004 activating the transfer request line to transmit state machine 1000 (Step 5104) when data are detected to be present in the interrupt source data buffer 5002. Transmit state machine 1000 (FIG. 3) reads the data out of the interrupt source data buffer 5002 and transfers it across the MoTel Bus (Step 5106) as one or more address/data pairs.

It is noted that the interrupt request to the MoTel Bus device does not require "command" transfers; instead only a single 8-bit "data" value is transferred. As such, the address byte of the address/data pair in this case contains a destination port address (programmed via the destination address register) in the port state machine, the command data bit is set to "data"; and the data position field set to "end". The data field is the encoded interrupt vector. For example, each bit of the data field may represent an interrupt source. Bits [7:4] are preferably reserved for host PC interrupts and bits [3:0] are preferably reserved for MoTel Bus bridge interrupt sources, though the host PC is capable of setting bits [3:0] during testing and debugging functions.

The target peripheral or MoTel bus device then stores the encoded interrupt vector in a register of its destination or receive port. In order to prevent inadvertently resetting bits in the MoTel Bus device's receive port, reading the data from the interrupt source data buffer 5002 by the transmit state machine 1000 clears the data out of the buffer 5002 (Step 5106). Reception of the encoded interrupt vector at the MoTel Bus device receive port causes the interrupt request to be generated to the appropriate functional unit, preferably a DSP on board the MoTel Bus device; the functional unit reads the encoded interrupt vector and clears the port's data register (Step 5108).

The functional unit will preferably store the data byte such that the next incoming interrupt byte is logically OR'ed with the stored byte (the act of reading and servicing the interrupt will cause the given bit to be cleared). If an encoded interrupt vector has already been stored, it is OR'ed with the current incoming vector (Step 5112). The result is stored (Step 5114), and the interrupt or interrupts are serviced (Step 5116). The logical OR operation takes place because each bit in the byte may represent an independent interrupt event. The MoTel Bus device may not complete servicing of all the interrupts transferred during one 8-bit transfer prior to the transfer of another interrupt byte. Accordingly, in order to ensure that an interrupt is not inadvertently lost, the logical OR operation operates to "save" the unserviced interrupts. It is noted that in alternate embodiments, the logical OR operation may occur before servicing any interrupting from the incoming vector, or depending on the encoding, may be dispensed with altogether.

Figure 11:
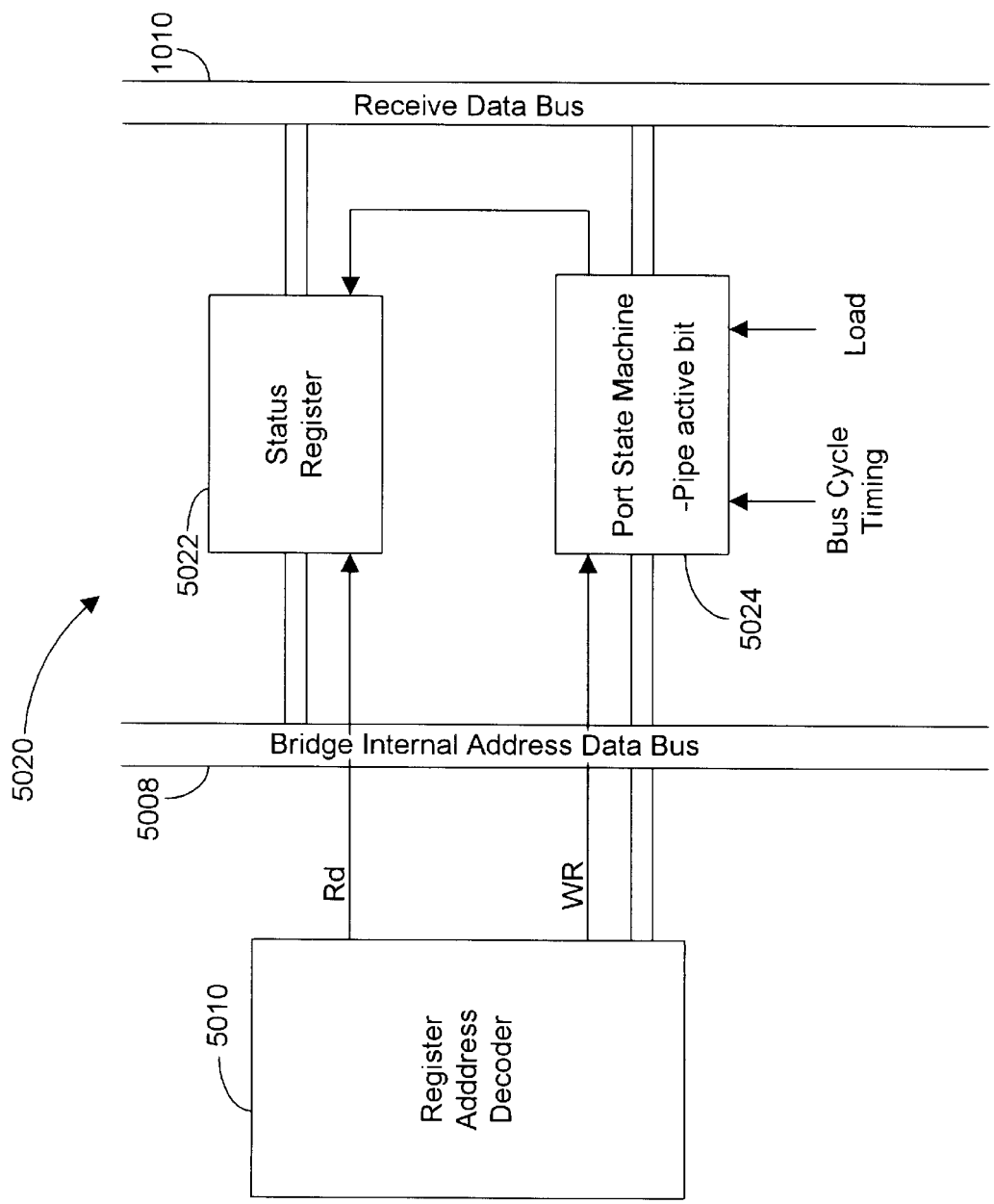
FIG. 11 is a block diagram of the port used to handle interrupt requests from a MoTel bus device to the host according to one embodiment of the present invention.
Figure 12:
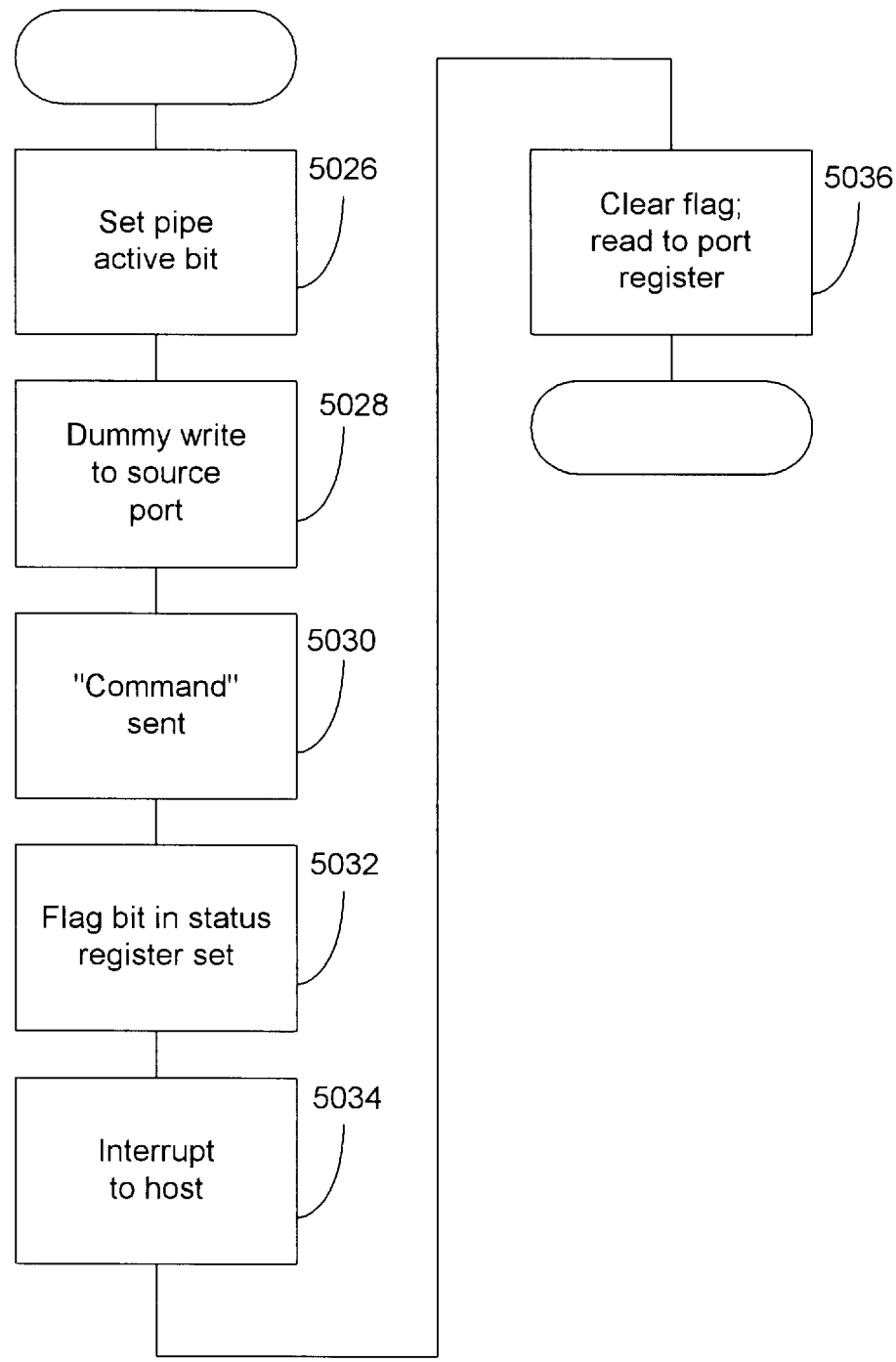
FIG. 12 is a flowchart illustrating the interrupt process employing the port of FIG. 11.

FIGS. 11 and 12: MoTel Bus Device Interrupts of PC

Turning now to FIG. 11, a block diagram of the port responsible for handling interrupt requests from the MoTel Bus or source peripheral device to the host PC or other device coupled or operably coupled to a first expansion bus is shown. Port 5020 includes a status register 5022 and a port state machine 5024 coupled to it. Port state machine 5024 is further coupled to receive data bus 1010. Both status register 5022 and port state machine 5024 are coupled to internal address data bus 5008 and register address decoder 1006.

Turning now to FIG. 12, a flowchart is shown of the interrupt process employing the port of FIG. 11. The pipe is activated by activating a destination port in the bus bridge for a transfer. More particularly, the host PC preferably sets the pipe active bit in the port state machine 5024 (Step 5026).

The MoTel bus device source peripheral also activates a source port. This is preferably accomplished through a DSP or other functional unit in the source peripheral performing a write to the source port on the MoTel Bus device (Step 5028). The functional unit preferably performs a "dummy" write because this interrupt mode requires no "data" transfers (data field is "don't care") and requires only a "command" transfer. For this transfer, the command/data field is set to "command", the data location field is set to "end", and the address field is set to the address of the port.

The MoTel Bus device source port transmits the command message to the destination port on the MoTel Bus bridge 68. Upon receipt of the command message at the destination port, a flag bit in the bus bridge status register is set (Step 5032). The flag bit indicates an interrupt request in the status register 5022, causing the bus bridge to generate an interrupt to the host PC or other device on the bus (Step 5034). When the host PC receives the interrupt request it will perform a read to the status register, clear the interrupt request flag (Step 5036) and service the interrupt.

Control Pipes

The control transfers involve status and command register reads and writes with an extra bus in the way. Four types of control pipes are supported: Reads and writes of registers within MoTel Bus devices 72a through 72d from the host PC 55 and reads and writes of registers within the MoTel Bus bridge 68 from the MoTel Bus devices 72a through 72c.

Figure 13:
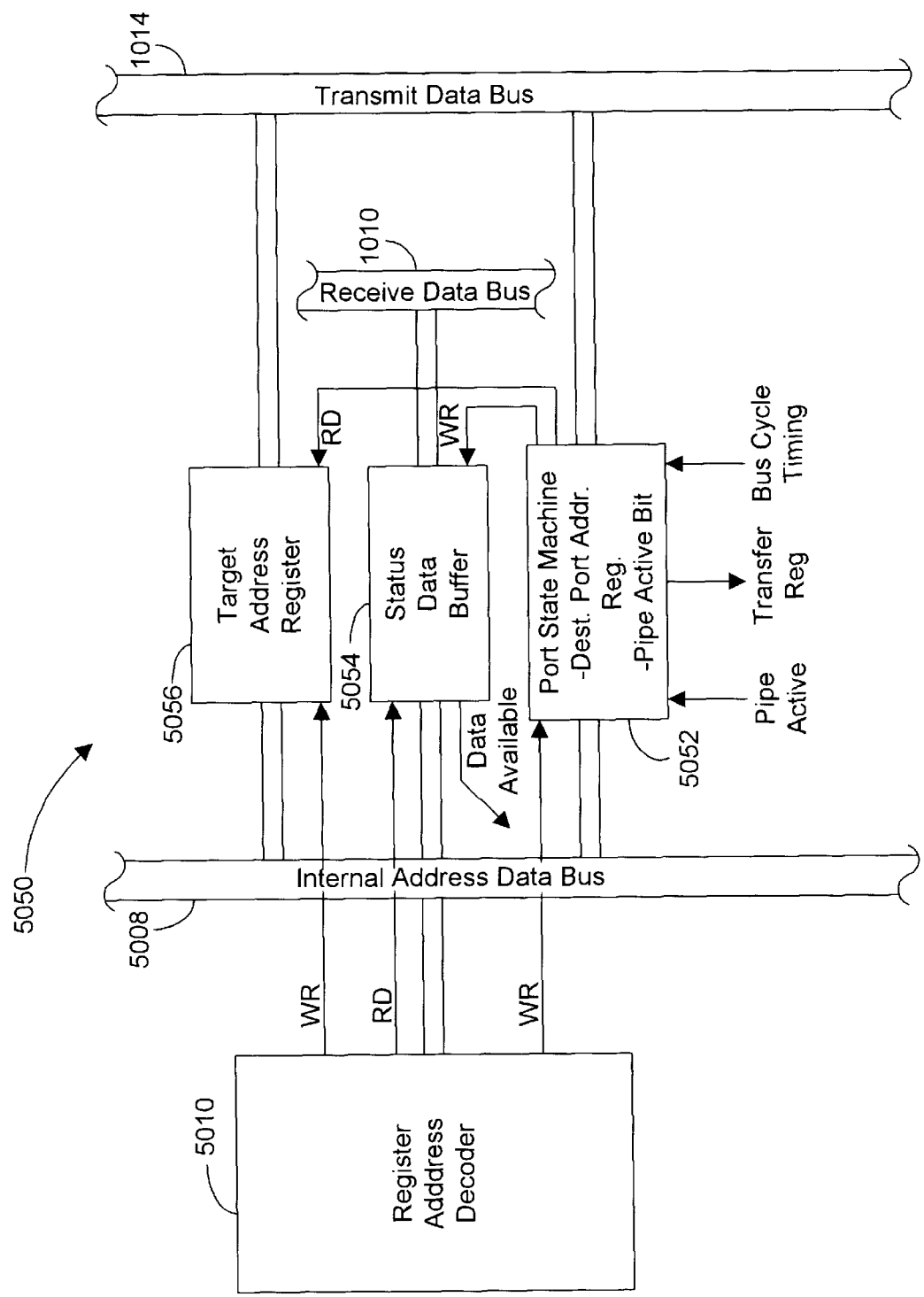
FIG. 13 is a block diagram of the dual port structure required for the host to read a register on a MoTel Bus device according to one embodiment of the present invention.
Figure 14:
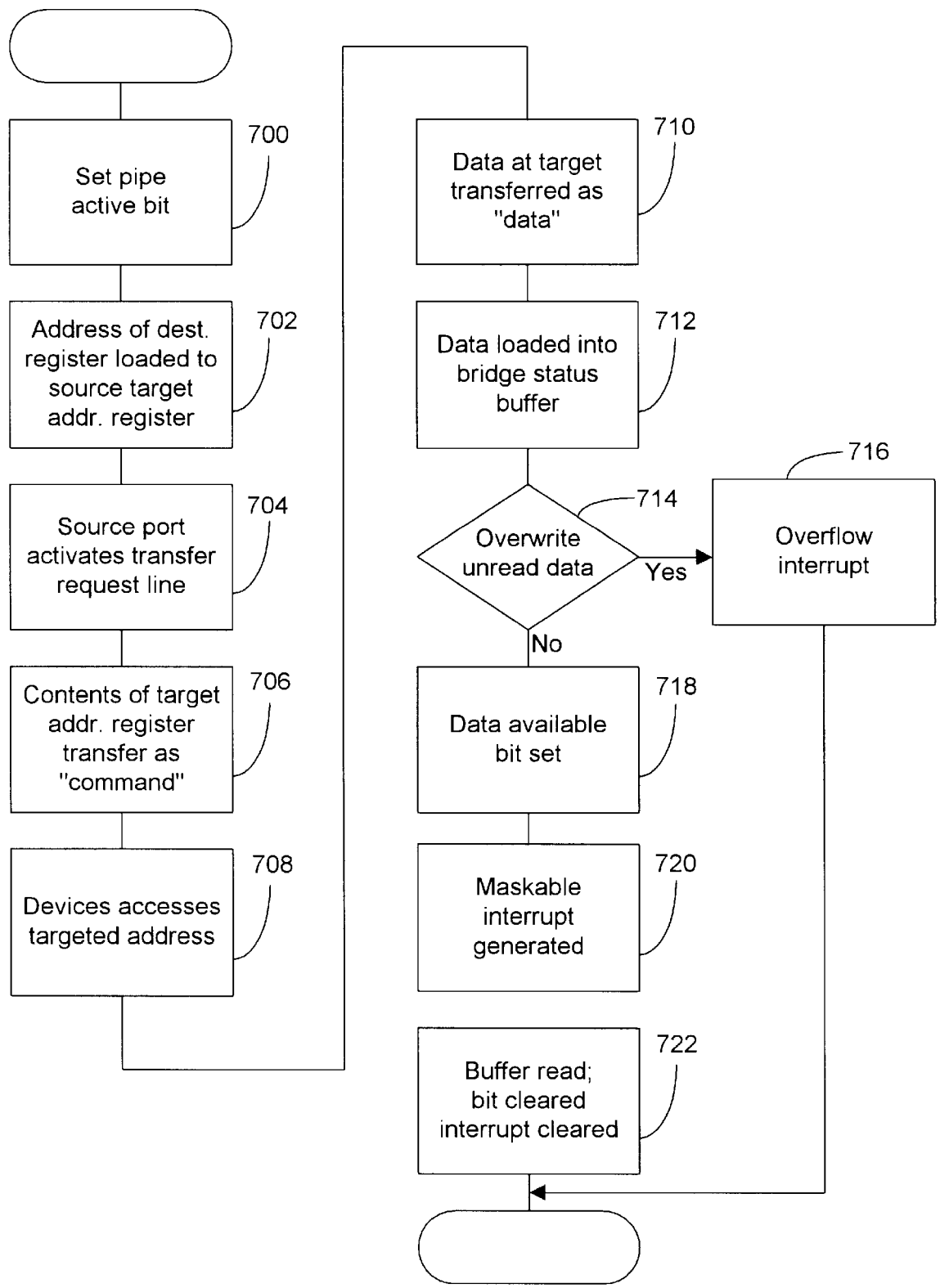
FIG. 14 is a flowchart illustrating the register read operation using the dual port structure of FIG. 13.

FIGS. 13 and 14: PC Read of Register on MoTel Bus Device

Turning now to FIG. 13, a block diagram is shown of the dual-port structure required for a host PC 55 to read a register on a MoTel Bus device. One port is used to transmit the target address of the register request and the other is used to receive the data from the register. Dual-port structure 5050 includes a port state machine 5052 including a destination port address register, an 8-bit status data buffer 5054, and an 8-bit target address register 5056. Port state machine 5052 and target address register 5056 are coupled to transmit data bus 1014. Status data buffer 5054 is coupled to receive data bus 1010. Port state machine 5052, status data buffer 5054 and target address register 5056 are each in turn coupled to internal address data bus 5008.

Turning now to FIG. 14, a flowchart illustrating the register read operation is shown. Reading the registers of the MoTel Bus device by the host PC is a two-stage process. Initially, a "command" transfer is sent to the MoTel Bus device identifying the register to be read. The MoTel Bus device then accesses its register and transfers the data to the MoTel Bus bridge via a "data" transfer.

More particularly, the port is activated by setting the pipe active bit in the appropriate register in the port state machine 5052. Once the pipe is initialized by setting the pipe active bit (Step 700), the host PC writes an address to the 8-bit target address register 5056 in the bus bridge (Step 702). When the address is written to the target address register 5056, the source port activates the transfer request line to the transmit state machine in the bus bridge (Step 704). This causes the bus bridge to transmit the contents of the target address register across the MoTel Bus via the data field of the "command" bus transfer (Step 706) (The transfer address byte in this case contains the destination port address which has been programmed via the port state machine; the command/data bit is set to "command"; and the data position field is set to "end").

The target peripheral device receives the command message, including the address of the register on the target peripheral device which is to be read. The target address register 56 preferably must be rewritten every time a register read on the MoTel Bus device is requested. Once the command message has been received, the destination port on the MoTel bus device reads the status register at the targeted address (Step 708), and transfers the data to a transmit port in the MoTel bus device. The transmit port in the MoTel bus device then transfers the data from the targeted address to the MoTel Bus bridge as a "data" cycle (Step 710).

Upon receiving the data, the MoTel bus bridge stores the received data. More particularly, the transceiver and the receive address decoder in the MoTel Bus bridge write the data to the bus bridge receive port's status data buffer 5054 (Step 712). Upon receipt of the status data byte, the port sets a data available bit and generates a maskable interrupt (Step 720). If the byte is a new status byte that is being processed prior to reading the previous one, the data are overwritten and an overflow interrupt is generated (Step 716).

Figure 15:
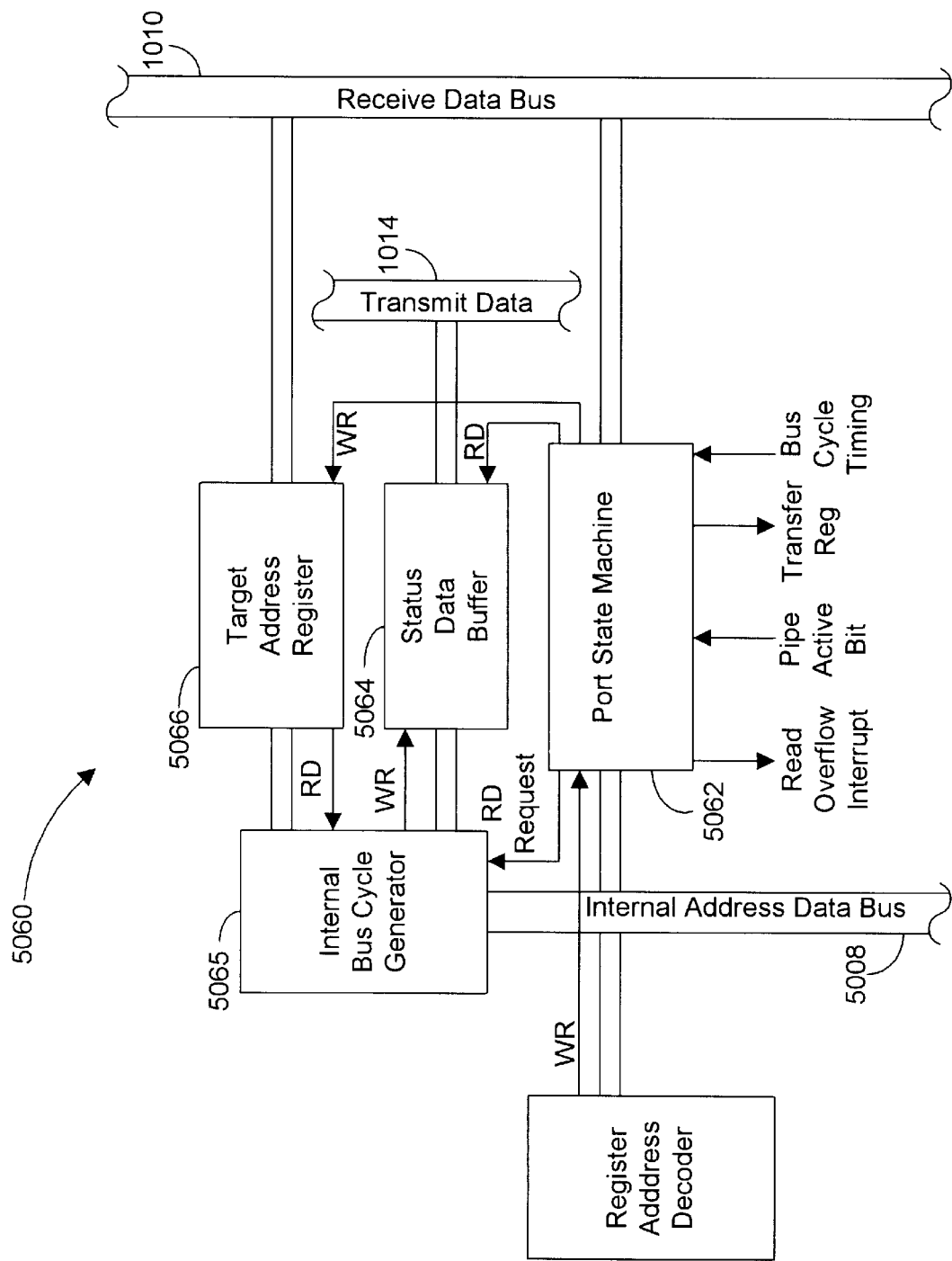
FIG. 15 is a block diagram of the port structure used to read a MoTel Bus bridge register by a MoTel Bus device according to one embodiment of the present invention.
Figure 16:
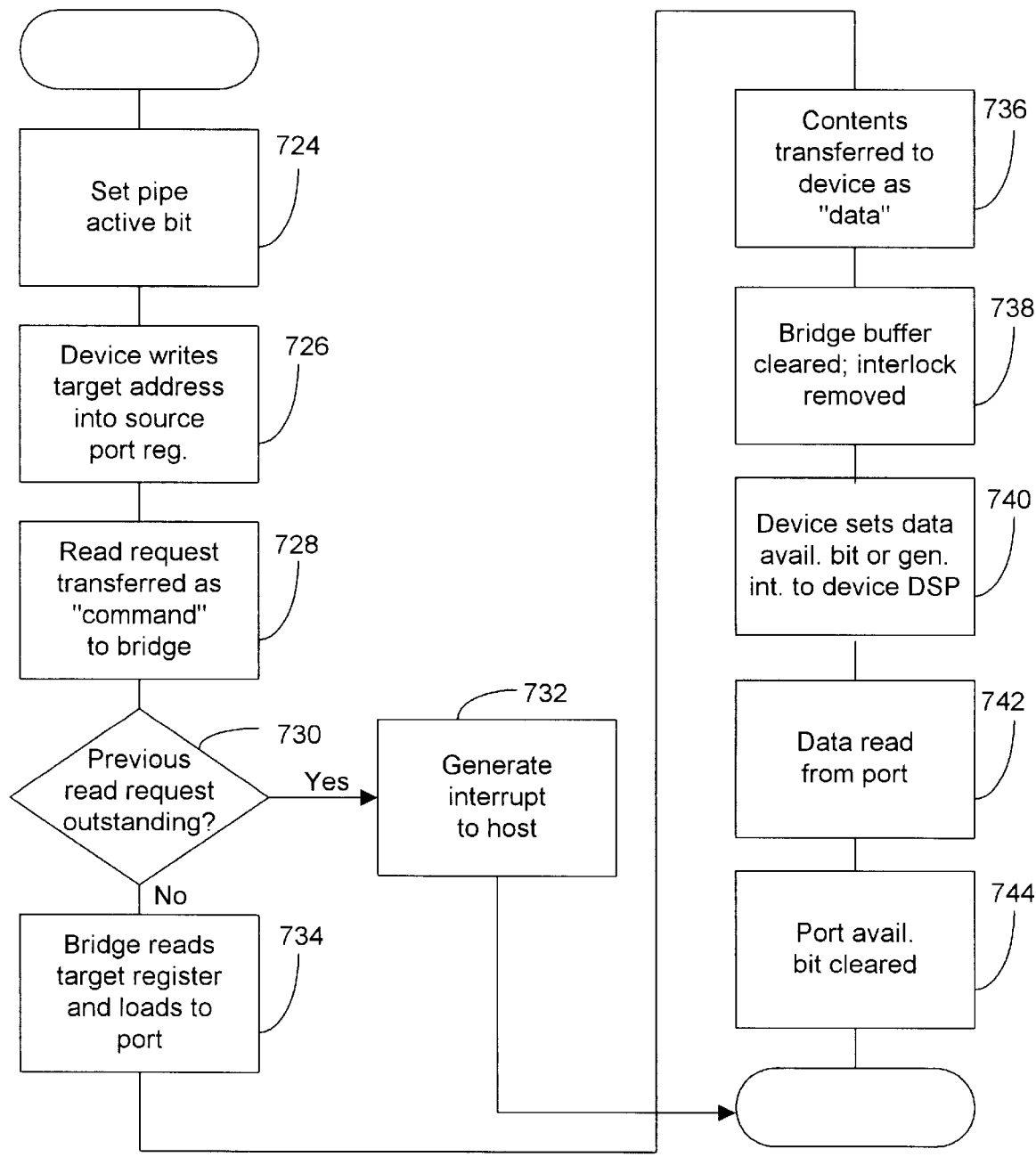
FIG. 16 is a flowchart of the read operation employing the port structure of FIG. 15.

FIGS. 15 and 16: MoTel Bus Device reads Register on Bus Bridge

Turning now to FIG. 15, a block diagram of the port structure used to read a MoTel Bus bridge register by a MoTel Bus device is shown. Port 5060 includes port state machine 5062, a status data buffer 5064 and a target address register 5066. Port state machine 5062 and target address register 5066 are each coupled to receive data bus 1010. Status data buffer 5064 is coupled to transmit data bus 1014. Target address register 5066 and status data buffer 5064 in turn are coupled to internal bus cycle generator 5065 which is coupled to internal address data bus 5008. Finally, port state machine 5062 is coupled to internal address data bus 5008. Internal bus cycle generator 5065 is used to access the requested target address and provide it to the status data buffer. It is noted that registers on the MoTel Bus bridge are preferably 16-bit registers. Thus, in order to access the 16-bit register, the MoTel Bus device will make two byte addressed reads for the registers.

Reading the MoTel Bus bridge registers by the MoTel Bus device is a two stage process. Initially, the MoTel Bus peripheral device sends a "command" to the MoTel Bus bridge identifying the register to be read. Next, the MoTel Bus bridge reads the data from the register and transfers it to the MoTel Bus device via a "data" transfer. Thus, a pair of ports is required to carry out this operation.

Turning now to FIG. 16, a flowchart of the read operation is shown. More particularly, the pipe is established by setting the pipe active flag (Step 724). The MoTel Bus device source peripheral then writes the address of the target register in the bus bridge that is to be read into an address register of the transmit port of the MoTel bus device (Step 726). Next, the MoTel Bus device sends a "command" transfer to a receive port on the MoTel Bus bridge containing the address of the target register to be read (Step 728).

Once the MoTel bus bridge receives the target address, the bus bridge loads the target address data into its target address register 5066. If no previous read request is outstanding, the bus bridge's internal bus cycle generator 5065 generates a read of the register targeted in target address register 5066 (Step 734). If, however, the read request has been received before the data from a prior read request has been transferred across the bus, the bus bridge generates a host interrupt and the request is ignored (Step 732). The bus bridge provides the status data from the register to the status data buffer 5064 within the bus bridge's transmit port (Step 734). The bus bridge then generates a data interface bus cycle that sends the status data as a data cycle to the MoTel Bus device at the predetermined destination port address in response to the data being loaded into the status data buffer (Step 736).

The MoTel Bus device interface sets a data available bit or generates an interrupt to a device DSP or functional unit when the data are received at the designated receive port (Step 740). The device interface then provides the data to the DSP or functional unit (Step 742) and clears the port available bit (Step 744).

Figure 17:
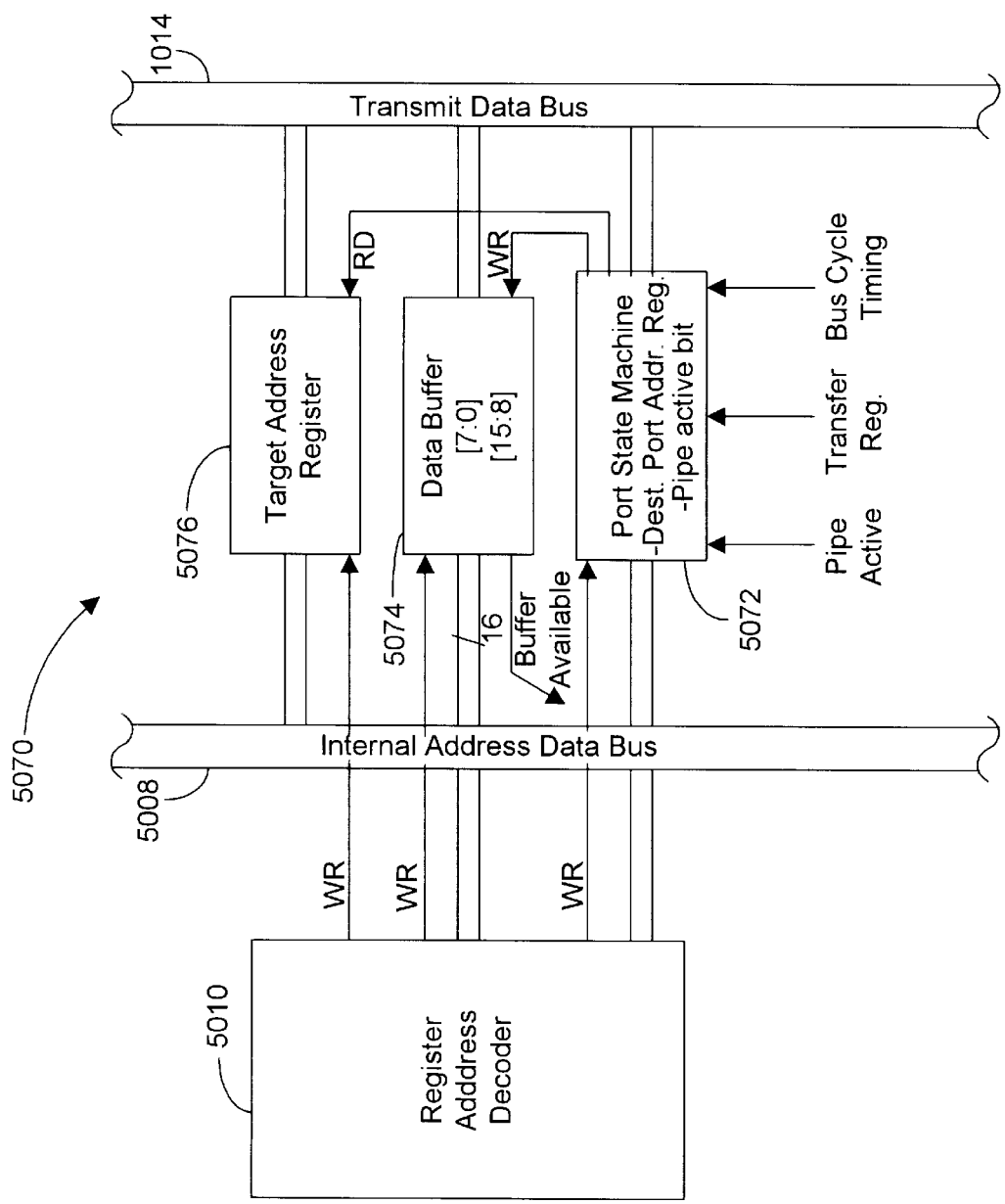
FIG. 17 is a block diagram of the port structure required to write a register on the MoTel Bus device from the host PC according to one embodiment of the present invention.
Figure 18:
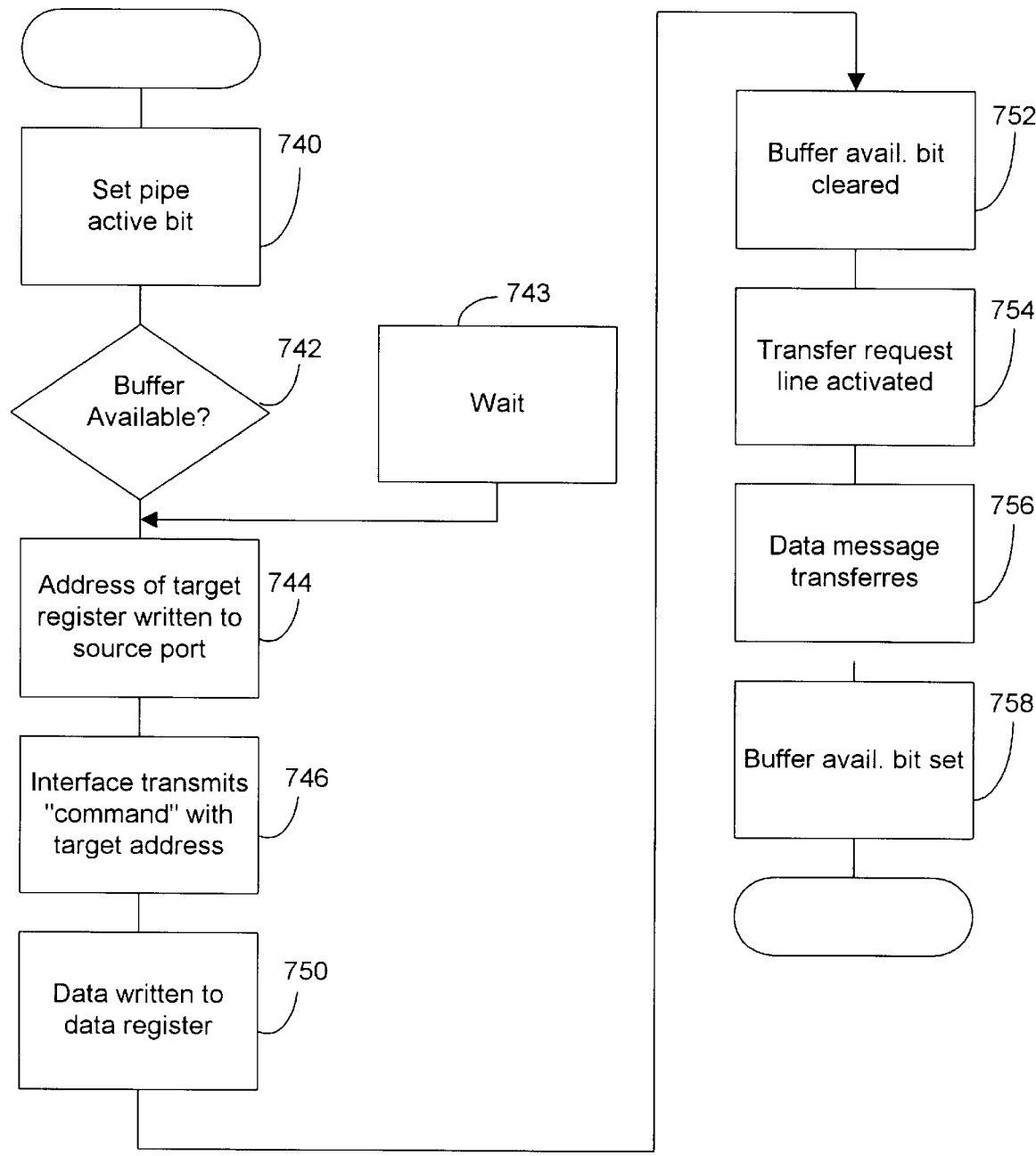
FIG. 18 is a flowchart illustrating the write operation employing the port structure of FIG. 17.

FIGS. 17 and 18: PC writes to MoTel Bus Device

Turning now to FIG. 17, a block diagram of the port structure required to write a register on a MoTel Bus device 72a through 72d from the host PC is shown. The port 5070 includes a port state machine 5072, a 16-bit data register 5074 and an 8-bit target address register 5076, each of which are coupled to transmit data bus 1014 and internal address data bus 5008.

Turning now to FIG. 18, a flowchart illustrating operation of the write operation is shown. The pipe is initialized by activating a register access source port in the bus bridge. Preferably, the register source port is activated by setting a pipe active bit (Step 740). If the data buffer 5074 has set the buffer available bit (Step 742), the host PC transfers a target address to the bus bridge across the PCI bus, which then stores the target address in its target address register 5076 (Step 744). The target address identifies the address of a register on the MoTel bus device target peripheral to which data are to be written. The bus bridge register source port activates the transfer request line to the transmit state machine. The interface then transmits the target address as a command message comprising one or more "command" transfers (Step 746), each comprising one or more address/data pairs. For example, the target address is transmitted as the data byte of an address/data pair, in which the address byte contains the destination port address and the data position field is set to "end"; and the command/data bit is to "command".

Once the target address has been written, the host PC writes the data word to the data register 5074 (Step 750) of the bus bridge. This activates the transfer request to the transmit state machine (Step 754) and clears the buffer available bit in the corresponding register (Step 752). The bus bridge then transmits the "data" message to a destination port in the target peripheral on the MoTel bus (Step 756). The contents of the data register are transferred as the data field of each address/data pair. The address byte contains the destination port address, the command/data bit set to "data"; and the data position field set to "start" for the first transfer and "end" for the second transfer. It is noted that two transfer cycles are required since the data buffer is preferably sixteen bits wide. Even in embodiments in which the target register is only eight bits wide, the data transferred preferably is always a sixteen bit quantity. If the target is only 8 bits wide, the upper 8-bits are discarded by the MoTel bus device when the data are written to the target register. Once the transfer is completed, the buffer available bit is again set (Step 758).

Figure 19:
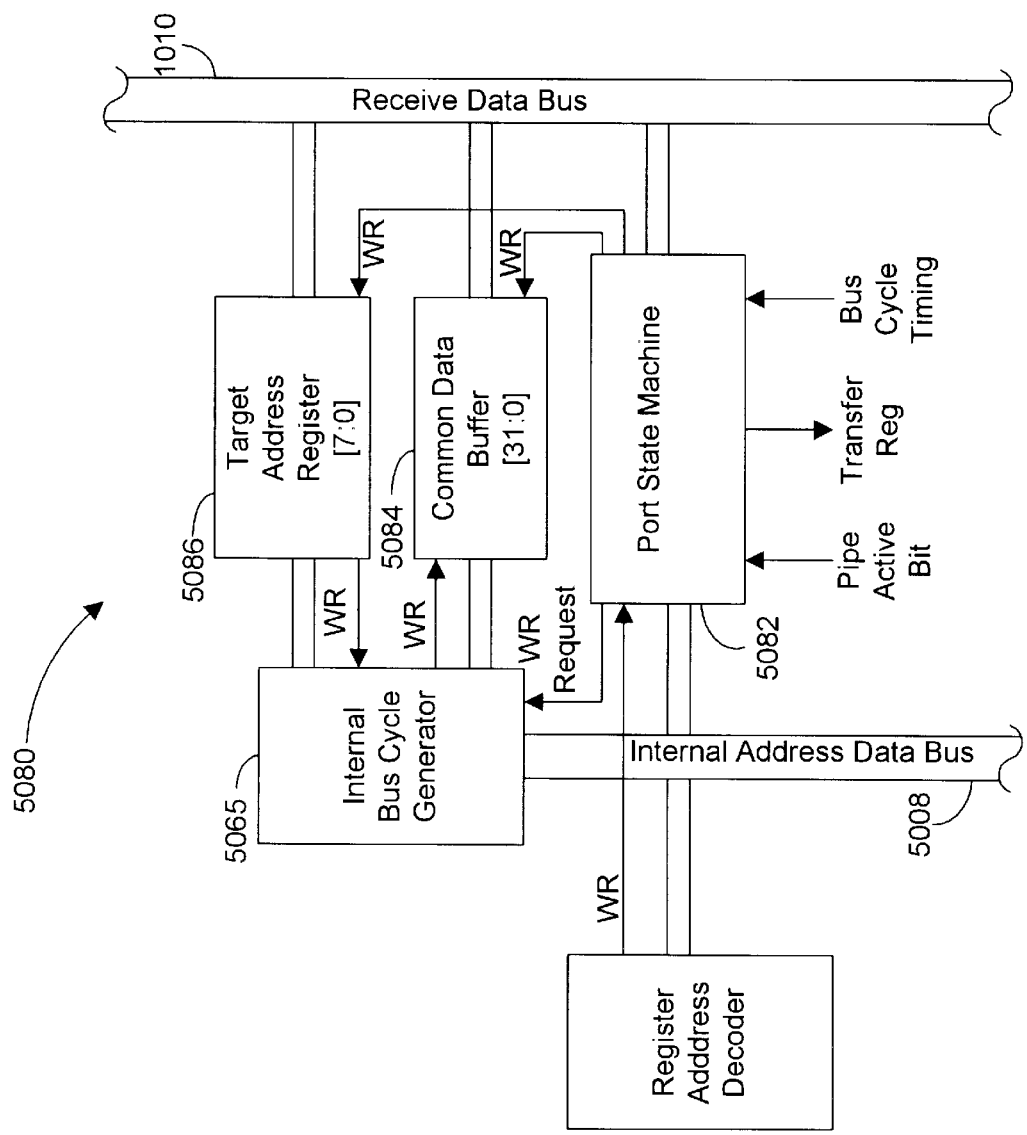
FIG. 19 is a block diagram of the port structure required to write a register on the MoTel Bus bridge by a MoTel Bus device according to one embodiment of the present invention.
Figure 20:
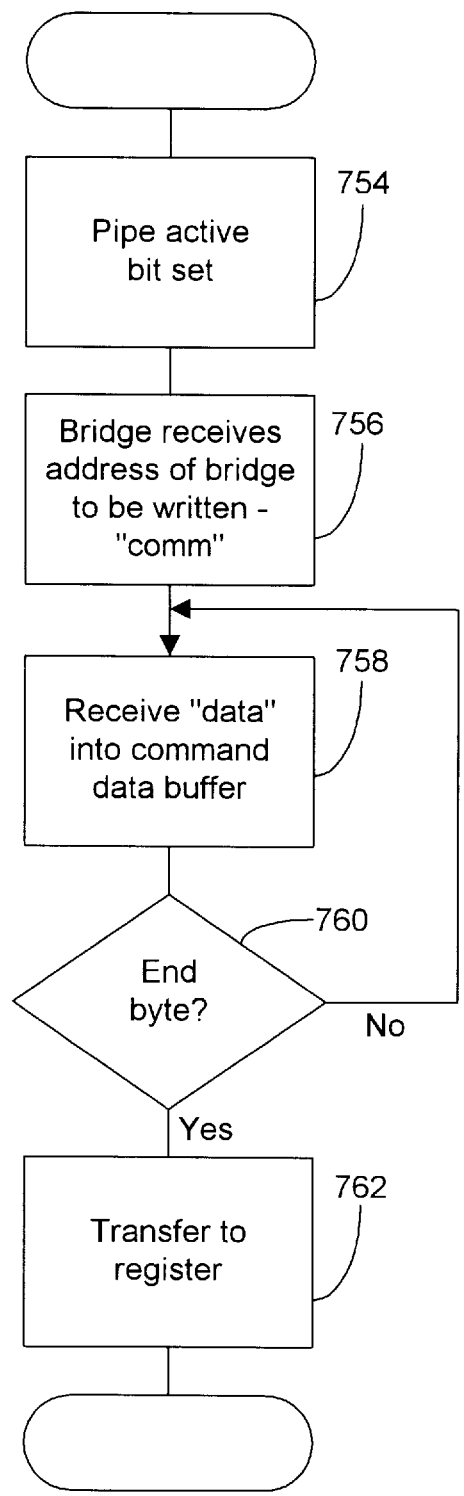
FIG. 20 is a flowchart illustrating the write operation employing the port structure of FIG. 19.

FIGS. 19 and 20: MoTel Bus Device writes to Bus Bridge

Turning now to FIG. 19, a block diagram of the mechanism required to write a register on the MoTel bus bridge 68 by a MoTel bus device 72a through 72d is shown. A port state machine 5082, a four byte command data buffer 5084 and a one byte target address register 5086 are coupled to receive data bus 1010. Port state machine 5082 is further coupled to internal address data bus 5008. Command data buffer 5084 and target address register 5086 are further coupled to internal bus cycle generator 5065. Internal bus cycle generator 5065 causes the data received at the command data buffer and identified by the target address register to be transferred as an internal bus cycle to the appropriate register.

Turning now to FIG. 20, a flowchart is shown of the write operation. The pipe is activated by setting the pipe active bit (Step 754). The MoTel Bus bridge 68 receives one or more register write command messages comprising one ore more address/data pairs from the MoTel Bus device 72a through 72d. These are "command" transfers containing the address of the MoTel Bus bridge register to be written (Step 756), the command bit is set to "command" and the data location field is set to "end." Depending on the width of the targeted register, (the maximum size is preferably 32 bits) the command may be followed by one or more "data" transfers. The address portion of the address/data pair is configured such that the command/data bit is set to "data", the data location field is set to "start", "middle" or "end", and the address field is set to the address of the port. The data portion of the pair contains the data to be written into the targeted register. The data are loaded into the command data buffer (Step 758) in byte-wise fashion with the lowest bytes filled first (Step 760). If only one byte is received, the byte is an "end" byte. Once the "end" byte is received, the received data is written into the targeted register by the internal bus cycle generator 5065.

Memory Pipes

Because the DSP or other functional units on board the MoTel Bus device are required to process large amounts of data, it is desirable to be able to transfer large blocks of data into and out of the MoTel Bus devices. Accordingly, memory move pipes are defined to load blocks of memory on the MoTel Bus device 72a through 72d from the host PC 55 as well as dumping memory from the MoTel Bus device to the host PC.

Figure 21:
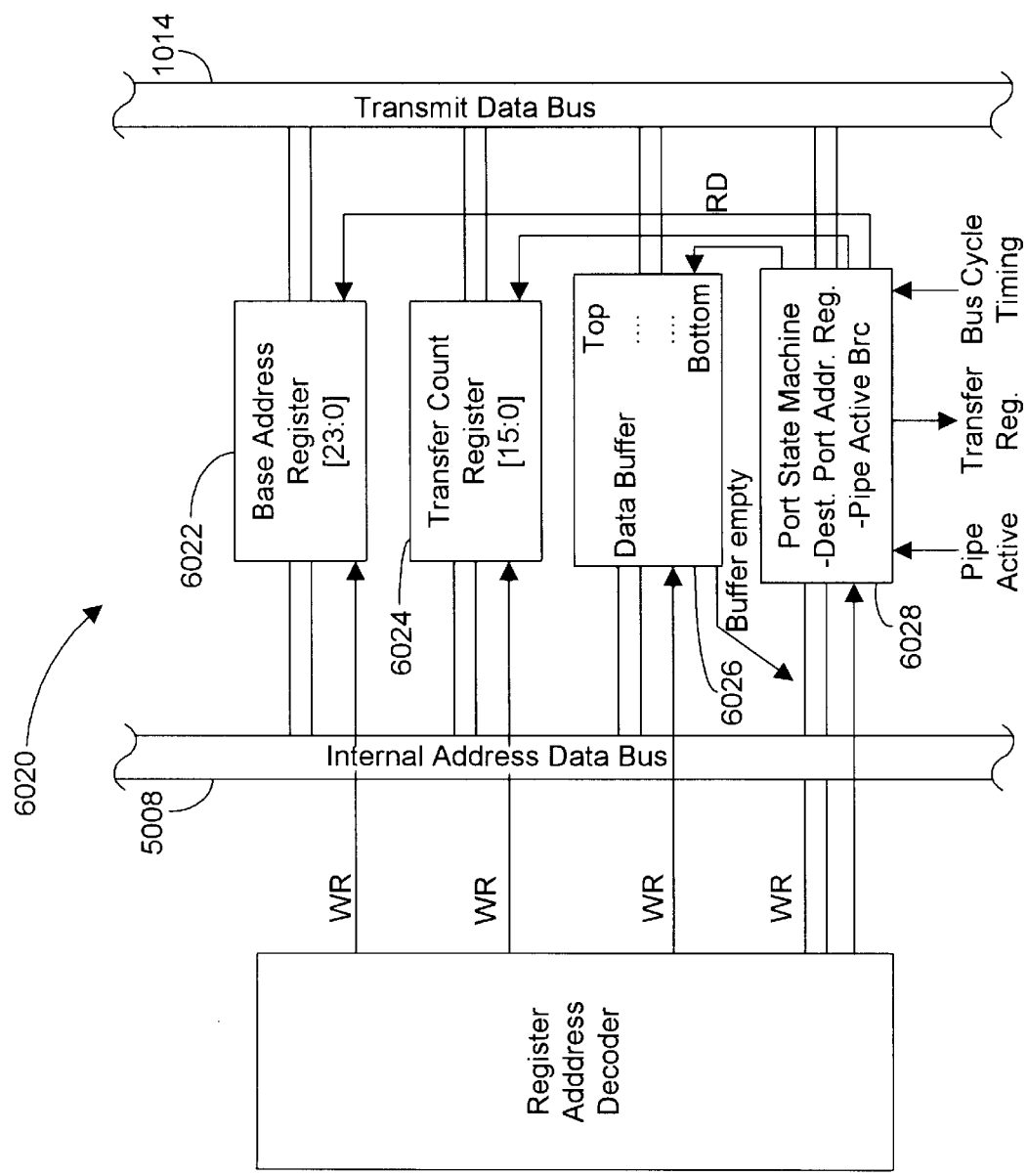
FIG. 21 is a block diagram of the transmit port used for a memory move pipe in writing blocks of memory to the MoTel Bus device from the host according to one embodiment of the present invention.
Figure 22:
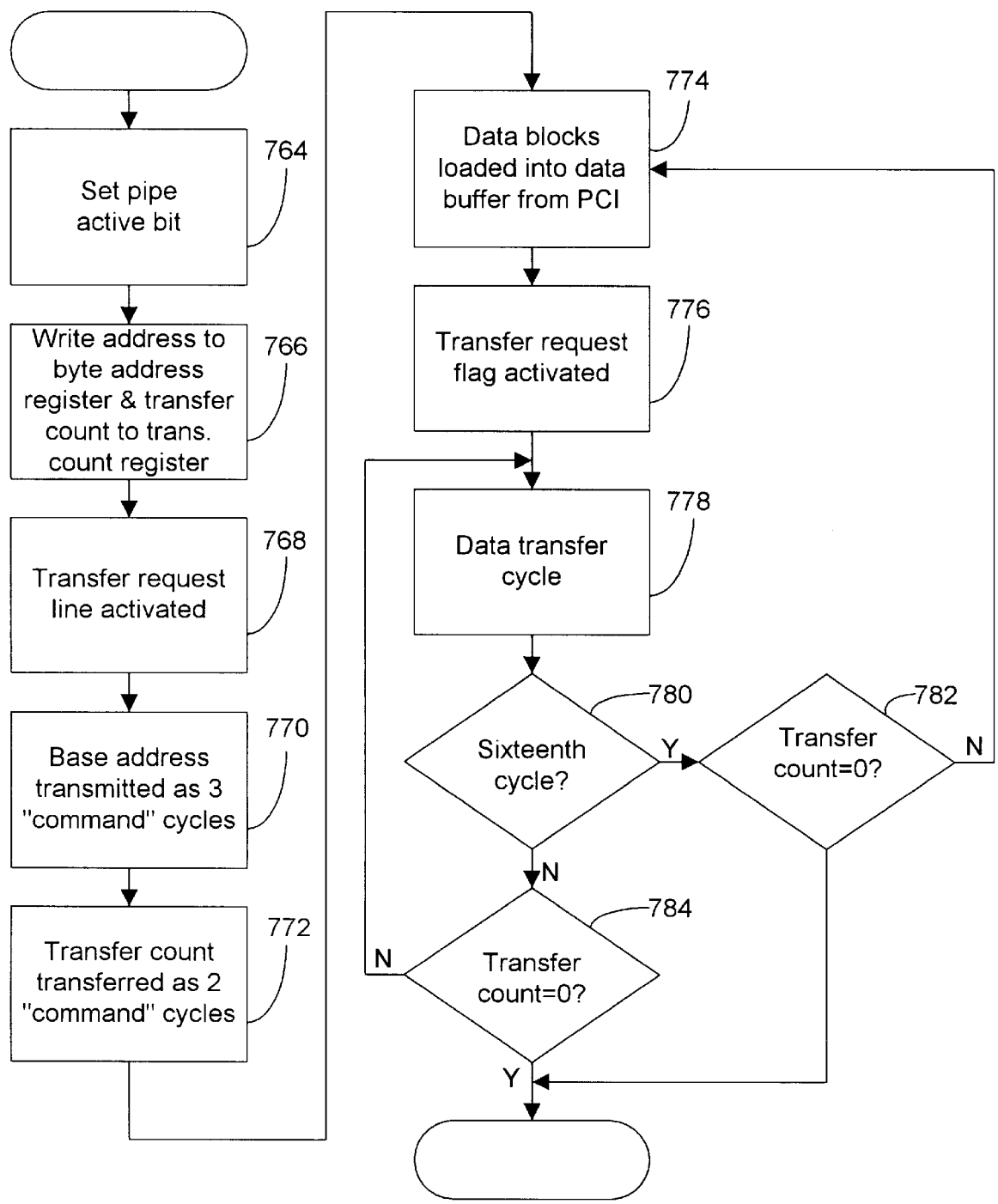
FIG. 22 is a flowchart illustrating the memory move process employing the transmit port of FIG. 21.

FIGS. 21 and 22: Memory Move from PC to MoTel Bus Device

FIG. 21 illustrates the transmit port used for a memory move pipe in writing blocks of memory to the MoTel Bus device from the host PC 55. The transmit port 6020 includes a 24-bit base address register 6022, a 16-bit transfer count register 6024, 16-byte data register 6026 (organized as four doublewords), and a port state machine 6028, each coupled to MoTel Bus bridge internal address data bus 5008, and transmit data bus 1014. Also coupled to internal address data bus 5008 is a register address decoder.

Turning now to FIG. 22, a flowchart is shown illustrating the memory move process. The pipe is configured for a transfer by activating a source port in the MoTel bus bridge. More particularly, the pipe active bit in the relevant register in the port state machine 6028 of the source port is preferably set (Step 764).

Next, the bus bridge receives into a register of the source port memory address and transfer size information from the host PC over the expansion bus. The memory address and transfer size information is indicative of a location and an amount of data to be transferred to a MoTel bus target peripheral device. The information preferably comprises a base address transferred to the source port's base address register 6022 and a transfer count in doublewords transferred to the transfer count register 6024 (Step 766). Loading the destination address to the base address register 6022 activates the transfer request line to the transmit state machine (Step 768).

The MoTel bus bridge transmits a command message or messages to a destination port of the MoTel bus target peripheral device. The command message(s) contains the address of the destination port as well as the memory address and transfer size information described above.

More particularly, the base address stored in base address register 6022 is transferred to the MoTel Bus target peripheral device in three command cycles as the "data" byte of three address data pairs (the address byte contains the destination port address as programmed by the destination port address register in port state machine 6028; the data position field is set to "start" for the least significant byte, "mid" for the second byte and "end" for the most significant byte; and the command data bit is set to "command") responsive to the base address register activating the transfer request line. (Step 770).

Once the bus bridge has transmitted the base address to the MoTel bus device, the source port transmits the transfer count in doublewords to the MoTel bus device as two more command cycles. Again, the least significant byte is sent as the "start" byte and the most significant byte is sent as the "end" byte (Step 772) and the command/data bit is set to "command."

Once the target peripheral device has received the command message or messages, it executes an interrupt. In particular, the DSP or other functional unit is notified via an interrupt that the memory move has been requested. The MoTel bus target peripheral device activates a data receive port to receive the incoming data.

Next, the MoTel Bus bridge's PCI bus interface accesses the PCI bus and starts writing data blocks into the MoTel Bus bridge source port's data buffer (Step 774). The source port in the bus bridge switches to "data" mode and sends any data words written into the data buffer to the MoTel Bus target peripheral device as one or more address/data pairs until the total number of doublewords has been transferred or the "pipe active" bit has cleared, clearing the transfer count register and resetting the port.

In a preferred embodiment, the data blocks comprise four 32-bit words loaded into the data buffer (Step 774). Once the data are loaded into the buffer, the transmit request line is activated to the transmit state machine (Step 776). Sixteen data transfer cycles are required to transfer the contents of the data register across the interface bus (Step 778, 770). For these transfers, the address byte of the address/data pair contains the destination port address; the command/data bit is set to "data"; and the data position field is set to "start" for the first, least significant byte, "end" for the final most significant byte, and "mid" for the fourteen bytes in-between (Step 778). Once the four double word block has been transferred, a request to send to the PCI interface for another data block as long as the transfer count is not zero (0) (Steps 780, 782, 784).

Figure 23:
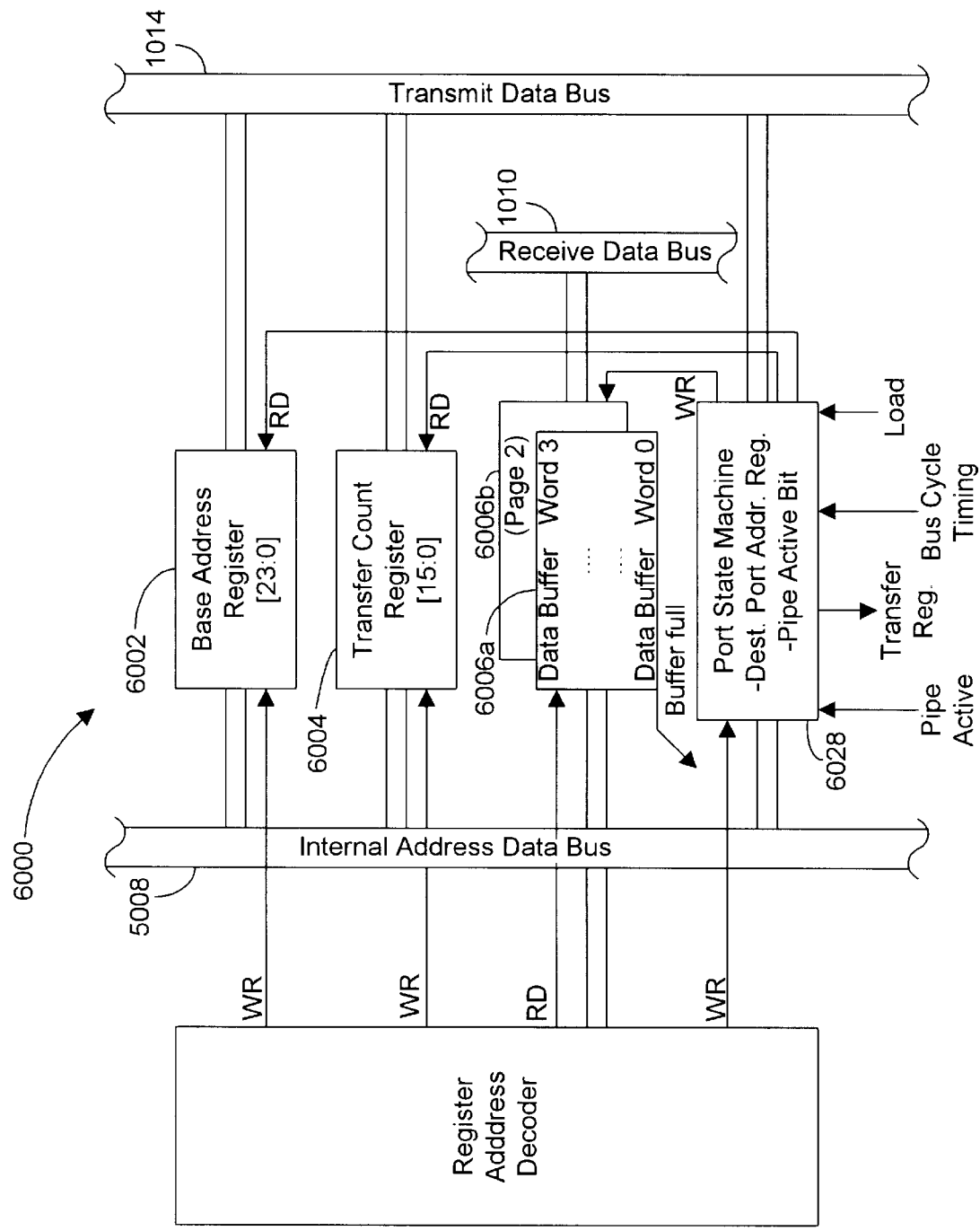
FIG. 23 is a block diagram illustrating the port structure required to establish a memory dump pipe from the MoTel Bus device to the host.
Figure 24:
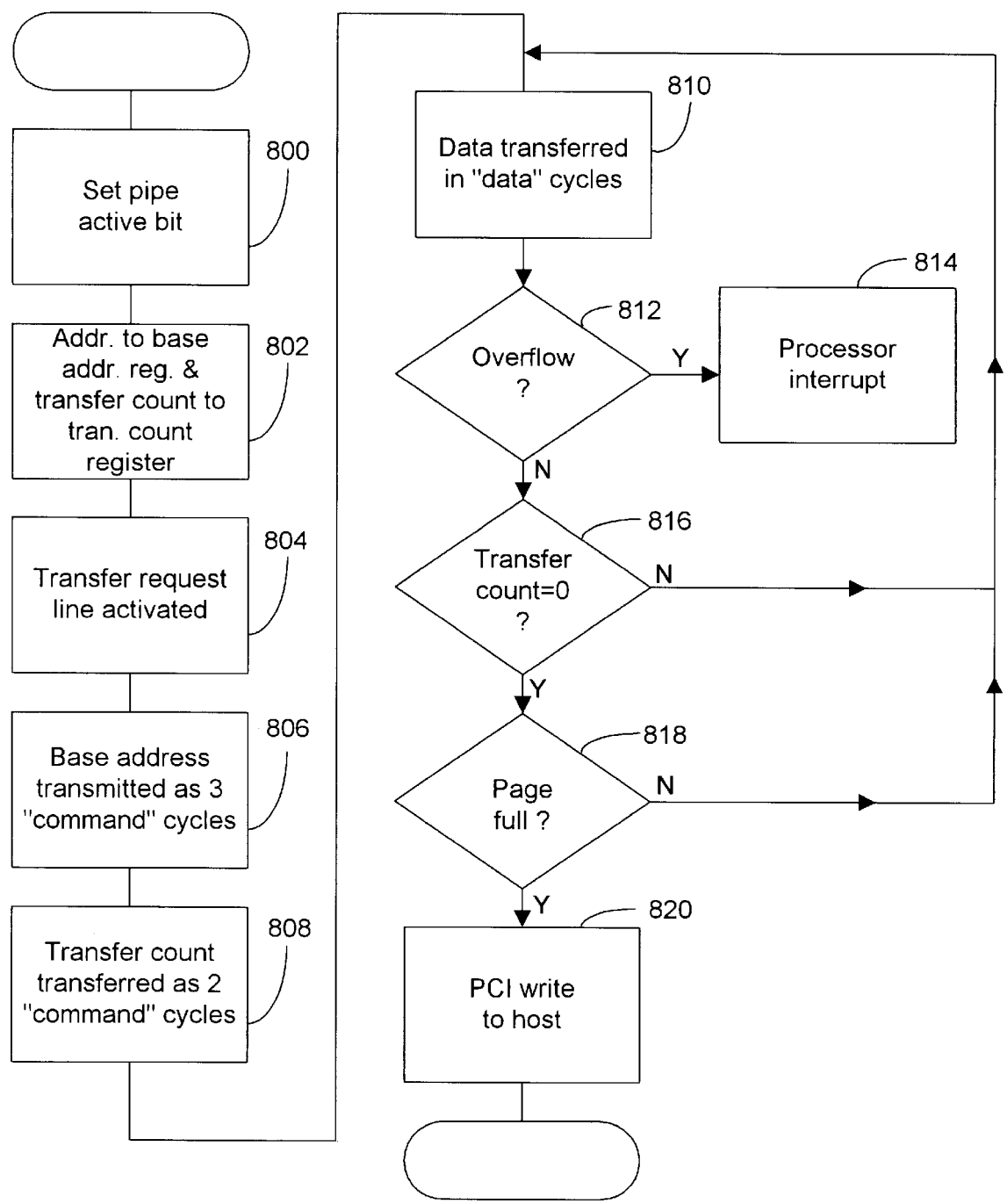
FIG. 24 is a flowchart illustrating the memory dump process of FIG. 23.

FIGS. 23 and 24: Memory Moves from MoTel Bus Device to PC

Memory dumps from the MoTel Bus device to the PC system memory are handled similarly. Turning now to FIG. 23, a block diagram is shown illustrating the transmit and receive ports required to establish the memory dump pipe. A dual port system 6000 includes a transmit port containing a 24-bit base address register 6002 and a 16-bit transfer count register 6004. The receive port contains a two page data buffer 6006a and 6006b. Also included in this system is port state machine 6008. Port state machine 6008, transfer count register 6004 and base address register 6002 are each coupled to transmit data bus 1014 and internal address data bus 5008. Two page data buffer 6006a, 6006b, is coupled to receive data bus 1010 and internal address data bus 5008.

Turning now to FIG. 24, a flowchart illustrating the memory dump process is shown. The pipe is activated by setting the pipe bit in the port state machine 6008 (Step 800) of the destination port of the bus bridge. The bus bridge receives the memory address and transfer size information. More particularly, the host PC writes the address of the data to be transferred to the base address register 6002 of the destination port and also transfers the transfer count to the transfer count register 6004 (Step 802). Writing the address to the base address register causes the destination port to activate the transfer request line to the transmit state machine (Step 804).

The bus bridge transmits one or more command messages to a source port of a source peripheral device, which includes the memory address and transfer size information. The base address is transmitted from the port in three "command" cycles, the base address being the data byte. The address byte contains the address of the destination port as programmed by the port state machine 6008; the data position field is set to "start" for the least significant byte, "mid" for the second byte, and "end" for the most significant byte; the command/data bit is set to "command" (Step 806). Upon transmittal of the base address, the port transmits the transfer count as two "command" bus cycles, with the least significant byte sent as the "start" cycle and the most significant byte sent as the end cycle.

Once the base address and transfer count have been transferred to the MoTel Bus source peripheral device, the MoTel Bus device executes an interrupt, thereby causing a data port to activate. The data port then receives the data to be transferred into a buffer in the data port. The MoTel bus device sends data to the MoTel Bus bridge destination receive port once the data are loaded. The data are loaded as blocks of four doublewords (Step 810). In the event of a buffer overflow, the new data are discarded and an interrupt is generated to the PC (Steps 812, 814). Sixteen transfer cycles are required to transfer each block from the MoTel Bus device across the interface bus to the MoTel Bus bridge one byte at a time. The address byte of the address/data pair contains the receive port address; the command/data bit is set to "data"; and the data position field is set to "start" for the first byte, "end" for the last byte, and "mid" for the fourteen in between. Each block is transferred as four bytes, in ascending order from least to most significant byte. As soon as any page of the port buffer is filled, a buffer full flag indication is sent to the PCI interface module, which writes the data out to the PC system memory one block at a time. Any data words written into MoTel Bus device data buffer are transferred to the MoTel Bus bridge data buffer until the total number of doublewords has been transferred (Step 816) or the pipe active bit is cleared (Steps 816, 818, 820).

Transport Pipes

The transport pipes are used to move isochronous data to and from functional units which produce streams of relatively low speed data. The MoTel Bus supports two types of transport pipes: 1) pipes with inherent flow control; and 2) pipes requiring external flow control.

Figure 25:
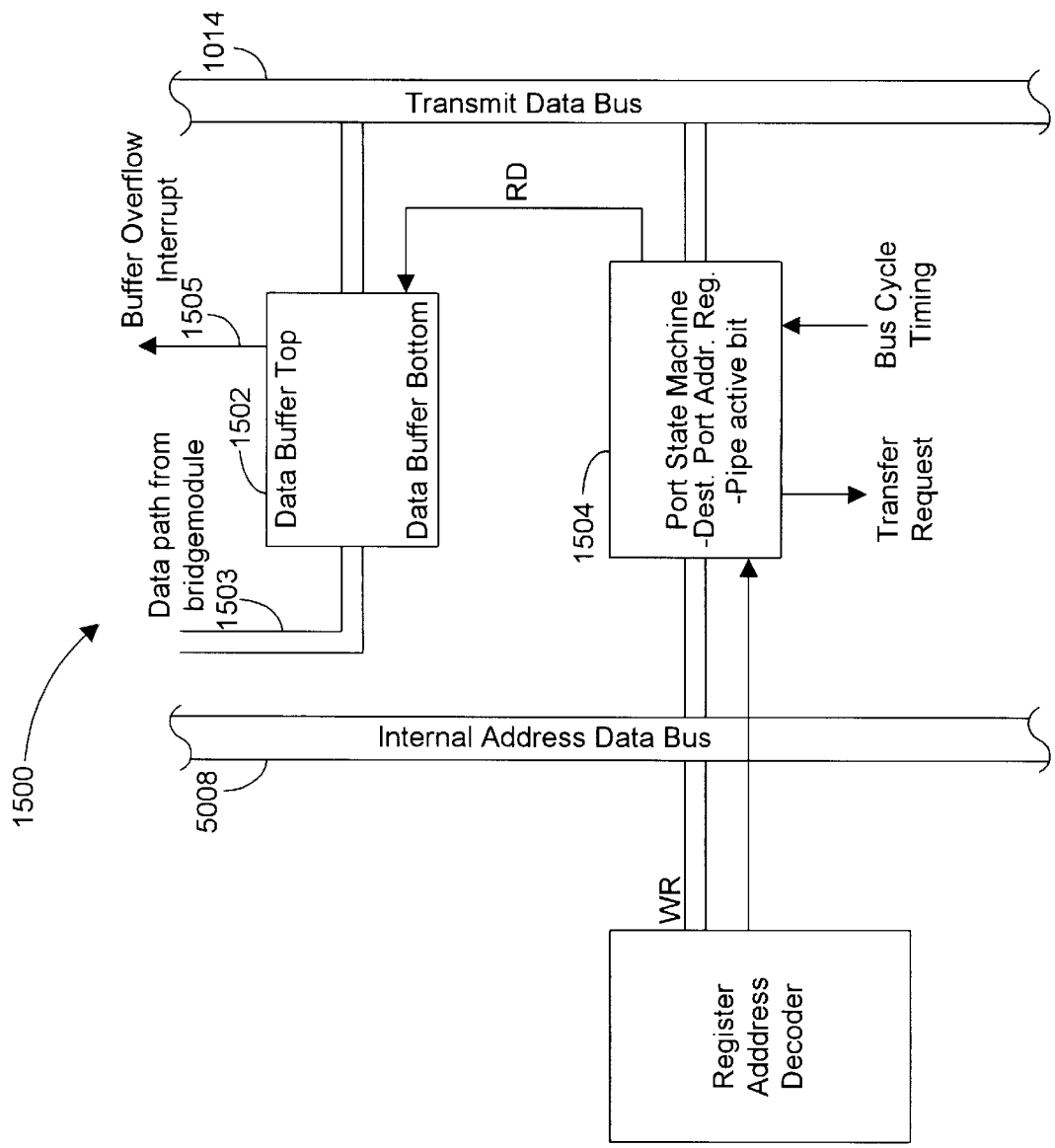
FIG. 25 is a block diagram illustrating a port used to support a transmit pipe having inherent flow control according to one embodiment of the present invention.
Figure 26:
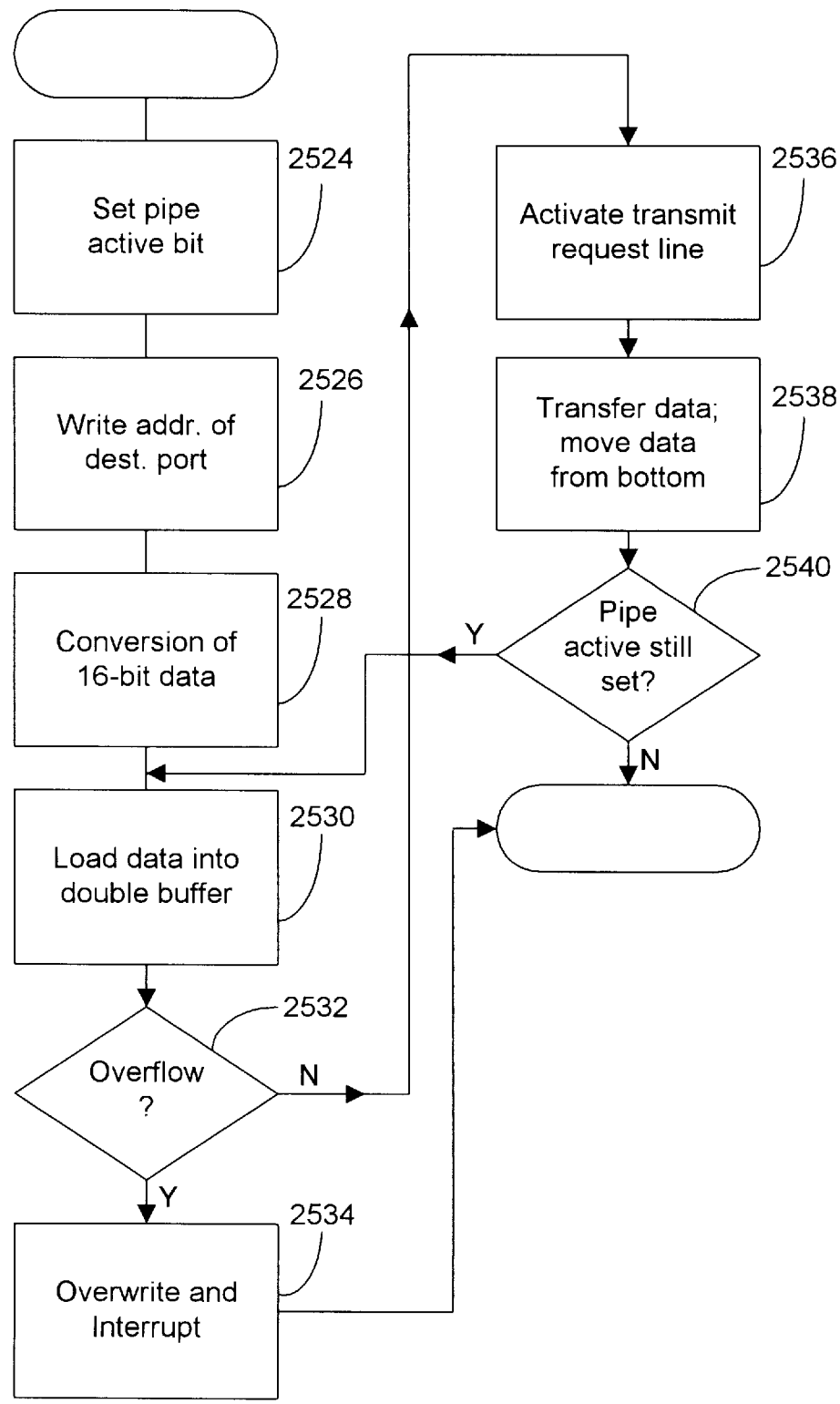
FIG. 26 is a flowchart illustrating operation of a transmit port having inherent flow control as in FIG. 25.

FIGS. 25 and 26: Transport Pipe with Inherent Flow Control

Turning now to FIG. 25, a block diagram illustrating a port 1500 used to support a transport pipe having inherent flow control is shown. Port 1500 is representative of, for example, a port used to transfer data from the DAA MoTel codec to the MoTel Bus device, from the audio synthesizer to the MoTel Bus device, or from the multimedia codec to the MoTel Bus device. Thus, a port similar to port 1500 can accommodate a plurality of isochronous data streams at different clock rates.

It is noted that in a preferred embodiment two identical pipes are required to transfer data from the multimedia codec to the MoTel Bus device (one for a left channel and one for a right channel to transmit stereo data). It is further noted that in a preferred embodiment eight identical channels may be used to provide 3-D audio localization from the synthesizer.

Source port 1500 includes a double buffer 1502 coupled to receive data from a functional module (such as a mixer, a DAA, or synthesizer) along data path 1503 and coupled as well to transmit data bus 1014. Double buffer 1502 is further configured to generate a buffer overflow interrupt signal along line 1505. Double buffer 1502 may be either eight bits wide or sixteen bits wide, depending on the data. For sixteen-bit data, such as that received from the DAA MoTel codec, either a sixteen-bit wide or an eight-bit-wide buffer may be used. Since data from the multimedia codec and the synthesizer may be either eight or sixteen bits wide, in one embodiment, eight bit wide buffers are used for the respective ports. When 16-bit data in two-byte format are transmitted, the data are converted into 8-bit single byte format prior to their being stored in the buffer.

Port 1500 further includes a port state machine 1504, which includes a destination port address register for storing an address identifying a destination port on a peripheral device. Port state machine 1504 is further coupled to transmit data bus 1014 and internal address data bus 5008 and is configured to orchestrate the transfer of data for the port.

Turning now to FIG. 26, a flowchart illustrating operation of a transmit transport pipe having inherent flow control is shown. A designated source port in the bus bridge is configured for the transfer by setting the pipe active bit in the destination port address register of the port state machine 1504 (Step 2524).

Next, the bus bridge receives from host PC 55 over the expansion bus the address of the destination port of the peripheral device. The bus bridge stores the destination port address in the destination address register within the port state machine of the source port (Step 2526).

The bus bridge then receives the data intended for the peripheral device from the expansion bus. The data are transmitted via data path 1503 into the double buffer 1502 (Step 2530), as further discussed below. If necessary, 16-bit data in two byte format are converted into 8-bit, single byte format (Step 2528) responsive to data size information received on the data size line.

In the event of a buffer overflow, new data overwrites the old data and an overflow interrupt on buffer overflow interrupt line 1505 is generated. It is noted that a buffer overflow should not occur since the isochronous data is considerably slower than the interface bus.

The port's transfer request line is activated responsive to the loading of data into the buffer, causing the transmit state machine to automatically read data out of the buffer (top byte first) and transfer it across the interface bus (Step 2536). The data are transferred as address/data pairs, with the address identifying the address of the destination port.

Reading data from the buffer 1502 clears the data out and allows any data word in the bottom half of the double buffer to move up (Step 2538). In step 2538, when sixteen bit data are transferred, the first (least significant) byte is tagged as the "start" byte and the second (most significant) byte is tagged as the "end" byte. In the case of eight bit data, the byte is tagged as an "end" byte.

Figure 27:
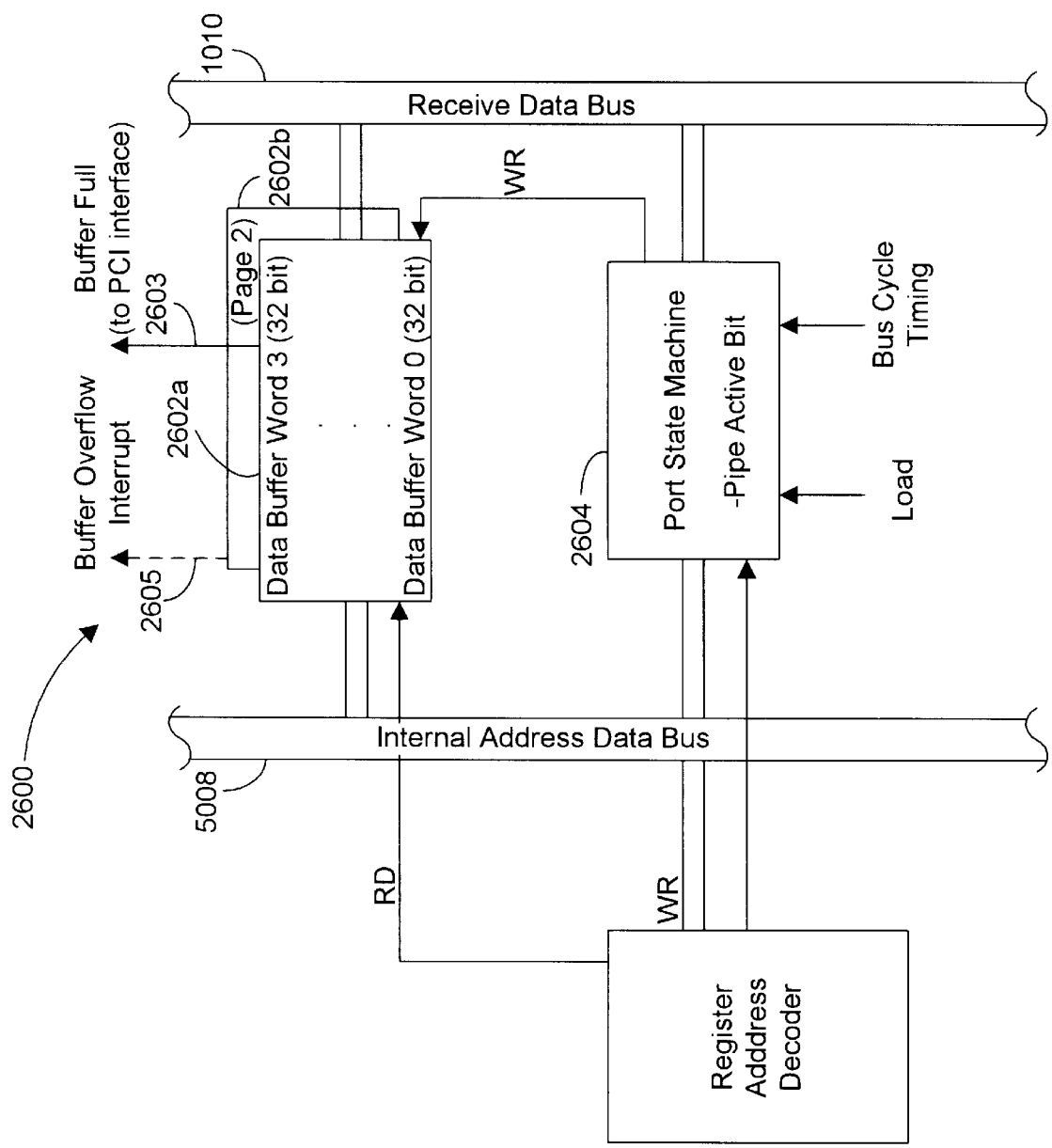
FIG. 27 is a block diagram of a port supporting the receive pipe having inherent flow control according to one embodiment of the present invention.
Figure 28:
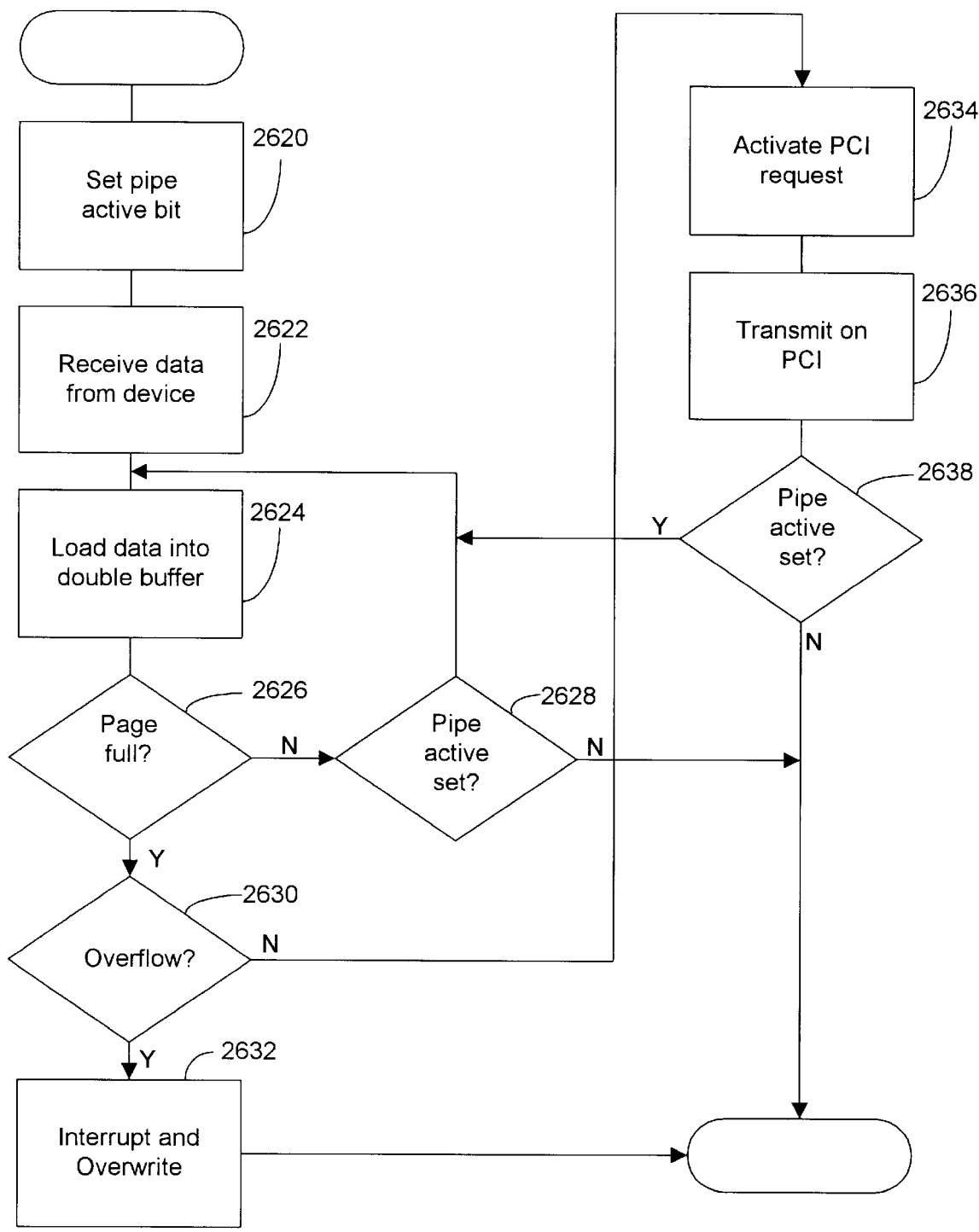
FIG. 28 is a flowchart illustrating operation of the inherently flow controlled receive port of FIG. 27.

FIGS. 27 and 28: Receive Ports with Inherent Flow Control

Inherent flow control for a plurality of isochronous data streams at different clock rates may also be used with receive ports. Turning now to FIG. 27, a block diagram of a port supporting a receive pipe having inherent flow control is shown. A two-page double buffer 2602a and 2602b is coupled to receive data bus 1010 and internal address data bus 5008. Two page double buffer 2602a, 2602b is configured to generate a Buffer Full signal to the PCI interface 2603 and a Buffer Overflow Interrupt 2605. The double buffers can accommodate two blocks of four 32-bit double words. The port 2600 also includes port state machine 2604 coupled to internal address data bus 5008. Port 2600 is representative of, for example, a port used to receive modem echo cancellation data and transmit it to the host PC, as well as ordinary modem data received from the MoTel Bus device and transmitted to the host PC. In the case of modem echo cancellation data, it is noted that the received data is preferably either in an eleven bit or seven bit format, which is handled as either sixteen bits or eight bits, respectively (i.e., the data location field will tag the data as "start" and "end," or just "end"). Echo cancellation data is sent in blocks of one or sixteen words. Modem data, however, is received as bytes, with the data location field set to "end." The inherently flow controlled receive port functions to collect data into four-double word blocks and notify the PCI interface when the data is to be moved to memory.

Turning now to FIG. 28, a flowchart is shown illustrating the operation of the inherently flow controlled receive port. The pipe is configured by a source port in a source peripheral and a destination port of the bus bridge being activated. For example, the pipe active bit of the destination port may be activated (Step 2620). Setting the pipe active bit causes data to be automatically received as one or more address/data pairs at the bus bridge from the MoTel Bus device (Step 2622) and loaded into the two page double buffer 2602a, 2602b (Step 2624) of the destination port, so long as the two page double buffer is not substantially full. The two page buffer receives the data as 32 bit doublewords with a first byte going into the least significant bits of each double word.

Once four thirty-two bit doublewords have been received (i.e., one block page), the destination port buffers two of the blocks and generates a PCI bus master request (Step 2626). The PCI interface is responsible for moving the data to the PC, including setting the destination address, which includes determining the base address plus a word count. The buffer within the PC is assumed to be one block in size. Once the entire block has been transferred, an interrupt is generated. When a page is substantially full, the port 2600 will inform the PCI interface along line 2603 (Step 2634) and the PCI interface will transmit the data (Step 2636). In the event of a buffer overflow (if the PCI bus is unavailable for two block times), new data will overwrite the old data, and an overflow interrupt along signal line 2605 is generated (Step 2630). The process will continue so long as the pipe active bit is set (Step 2638).

Figure 29:
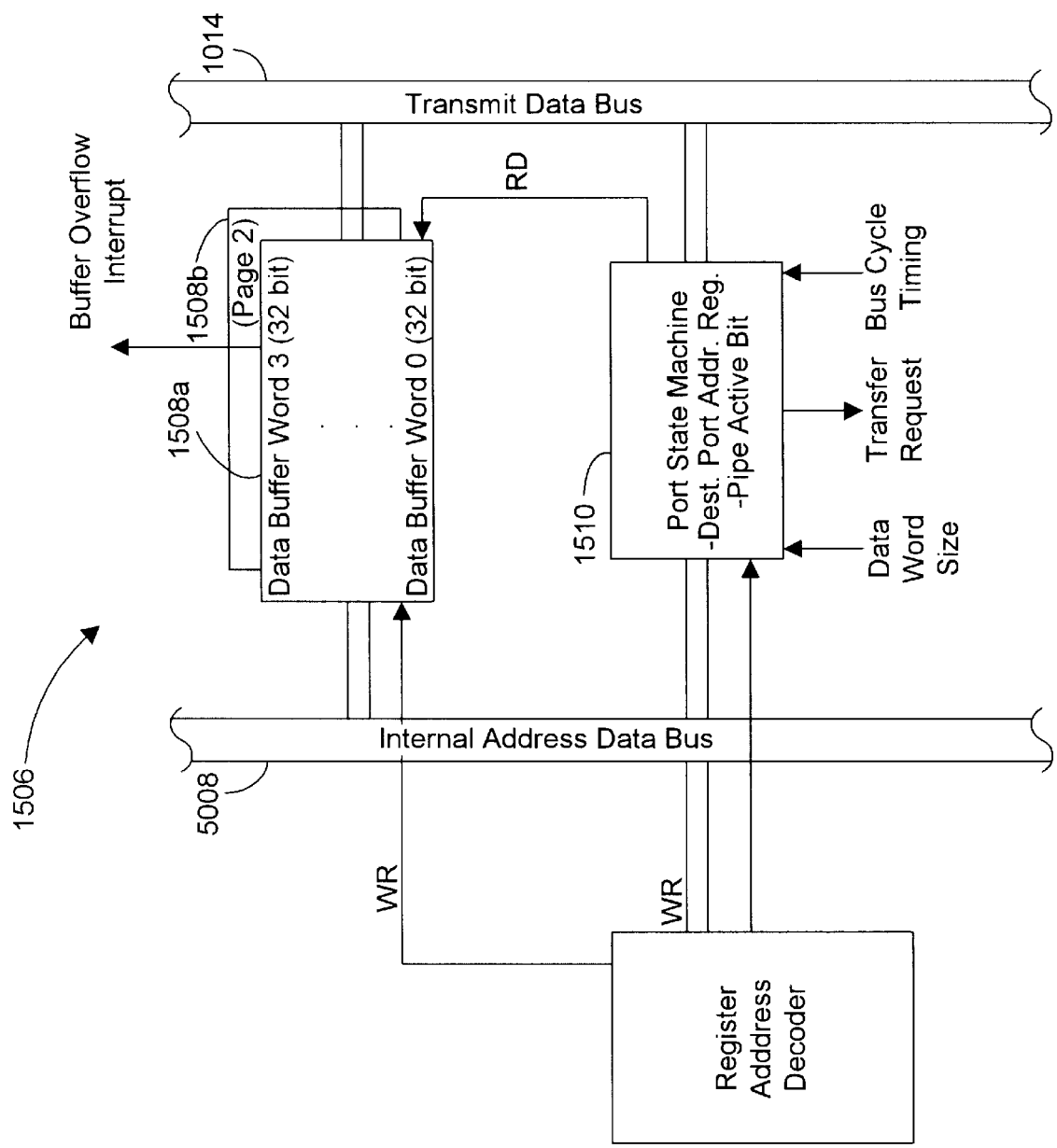
FIG. 29 is a block diagram of a modem echo cancellation port supporting an inherently flow controlled pipe according to one embodiment of the present invention.
Figure 30:
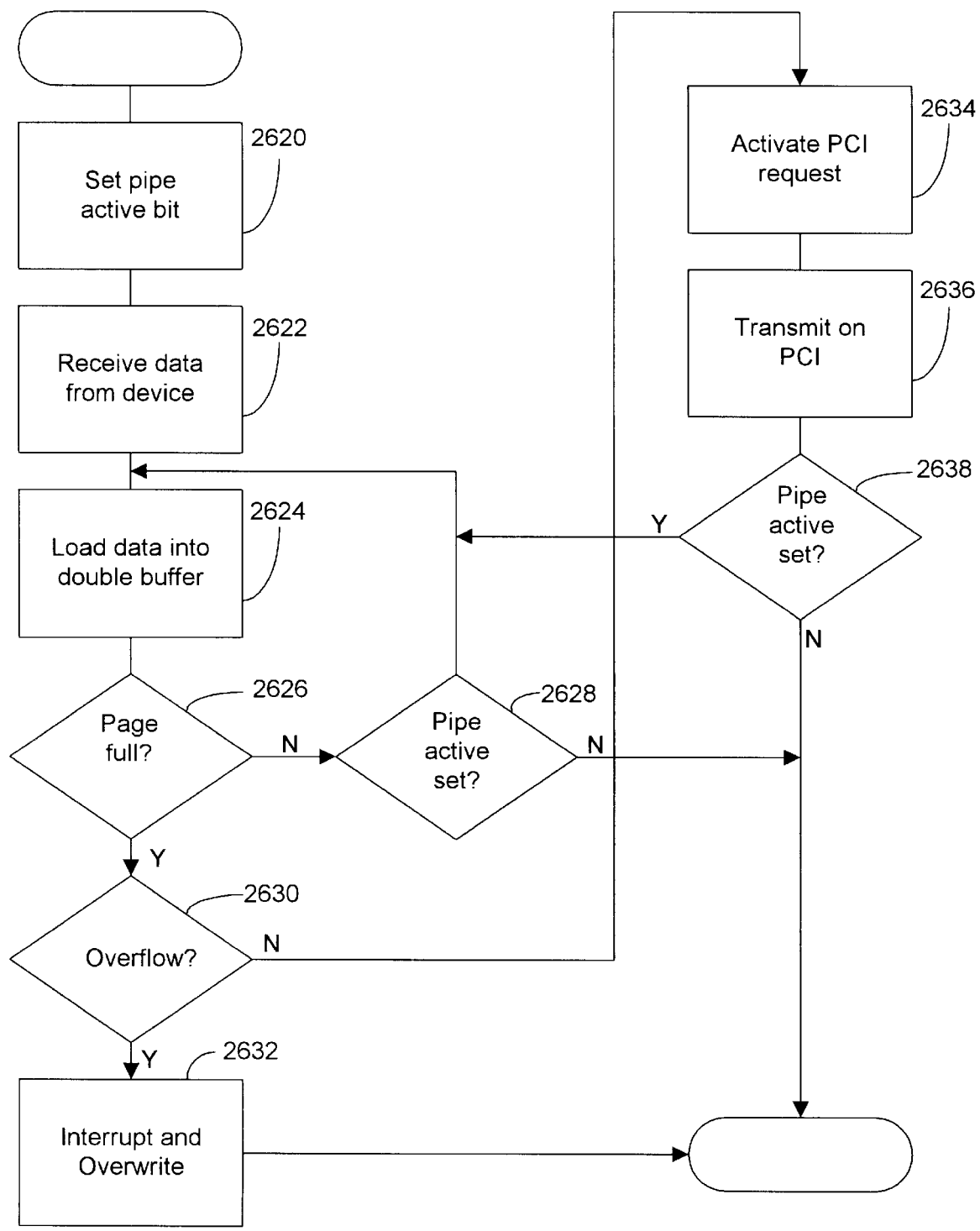
FIG. 30 is a flowchart illustrating operation of the port illustrated in FIG. 29.

FIGS. 29 and 30: Transfer from PC to MoTel Device using Inherent Flow Control The transmission of modem echo cancellation data from the host PC 55 via the MoTel Bus bridge 68 to the MoTel Bus device 72a through 72d also occurs along an inherently flow controlled pipe. FIG. 29 shows a block diagram of the modem echo cancellation port supporting the pipe. Port 1506 includes a two-page double buffer 1508a, 1508b coupled to transmit data bus 1014 and internal address data bus 5008. In addition, port state machine 1510, which includes a destination port address register and a pipe active bit, is coupled to transmit data bus 1014 and internal address data bus 5008. Port state machine 1510 is also coupled to transmit a read signal to double buffer 1508a, 1508b. Furthermore, port state machine 1510 receives a Data Word Size bit to indicate whether the word is eight or sixteen bits long. The echo cancellation data itself is in either 11 or 7 bits format depending on the type of modem operation. The eleven bit data is handled as 16 bits; the seven bit data is handled as 8 bits.

Turning now to FIG. 30, the port starts with the port inactive. The host PC 55 sets the pipe active bit (Step 2510) in the bus bridge. The host PC 55 then writes the address of the destination port into the destination address register within the port state machine (Step 2512) of the bus bridge. The echo cancellation data is transmitted from the PC memory along the PCI bus as four thirty-two bit words. The PCI interface loads the data into the double buffer. When one page of the double buffer is full, the double buffer activates the transmit request line (Step 2520) and transfer the data along the bus interface (Step 2522). If an overflow occurs, the data is overwritten and an interrupt is triggered. Since the modem echo cancellation data is either eight or sixteen bits wide, the port tags the transfers as either "end", or "start" and "mid," as appropriate, with a data word size indication received from the multimedia codec module. Finally, while the contents of one page of the double buffer are being transmitted across the MoTel Bus, the second page is filled by the PCI interface, so long as the pipe active bit is set (Step 2524).

Figure 31:
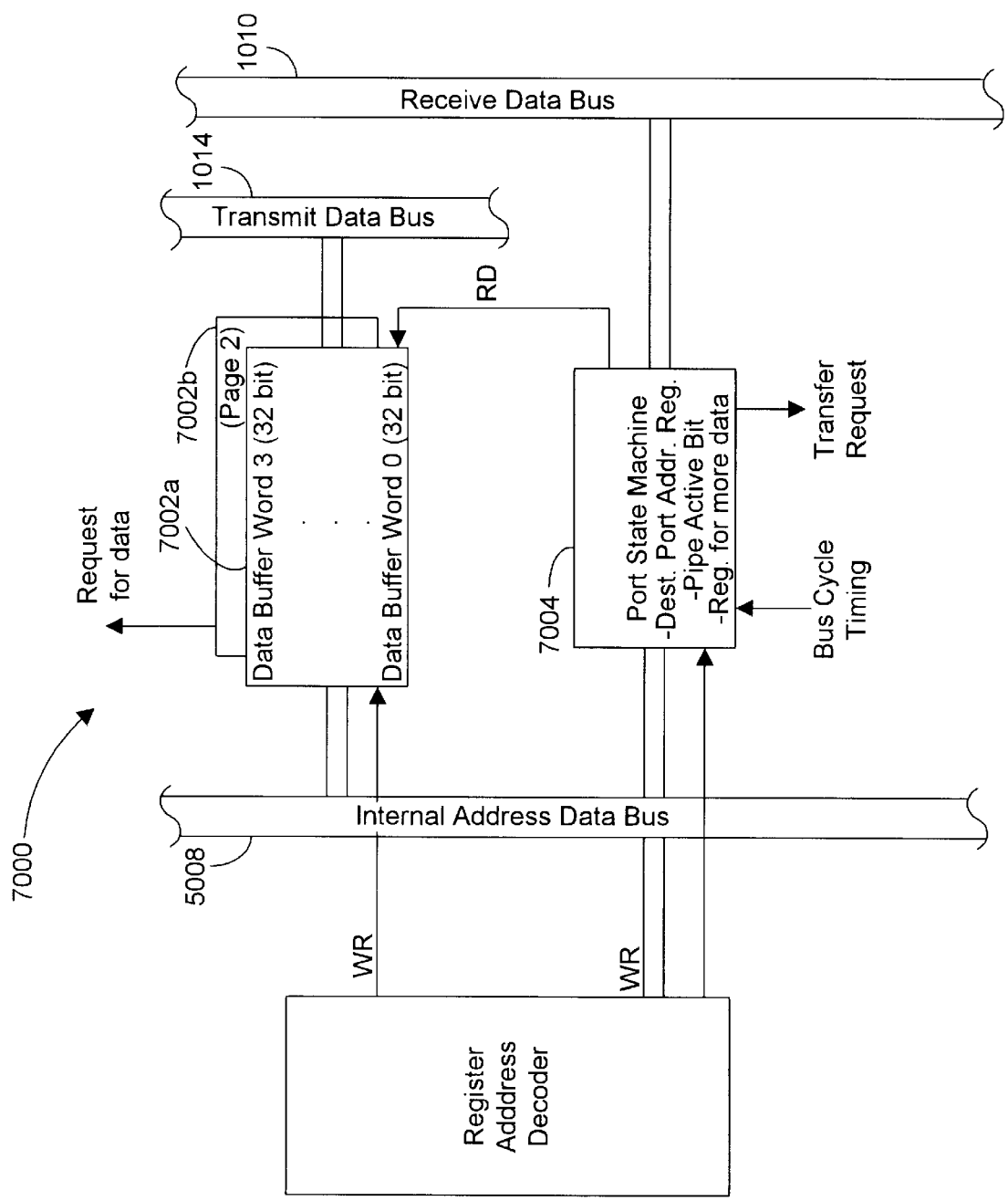
FIG. 31 is a block diagram of a dual port structure required to support a transmit pipe having external flow control.
Figure 32:
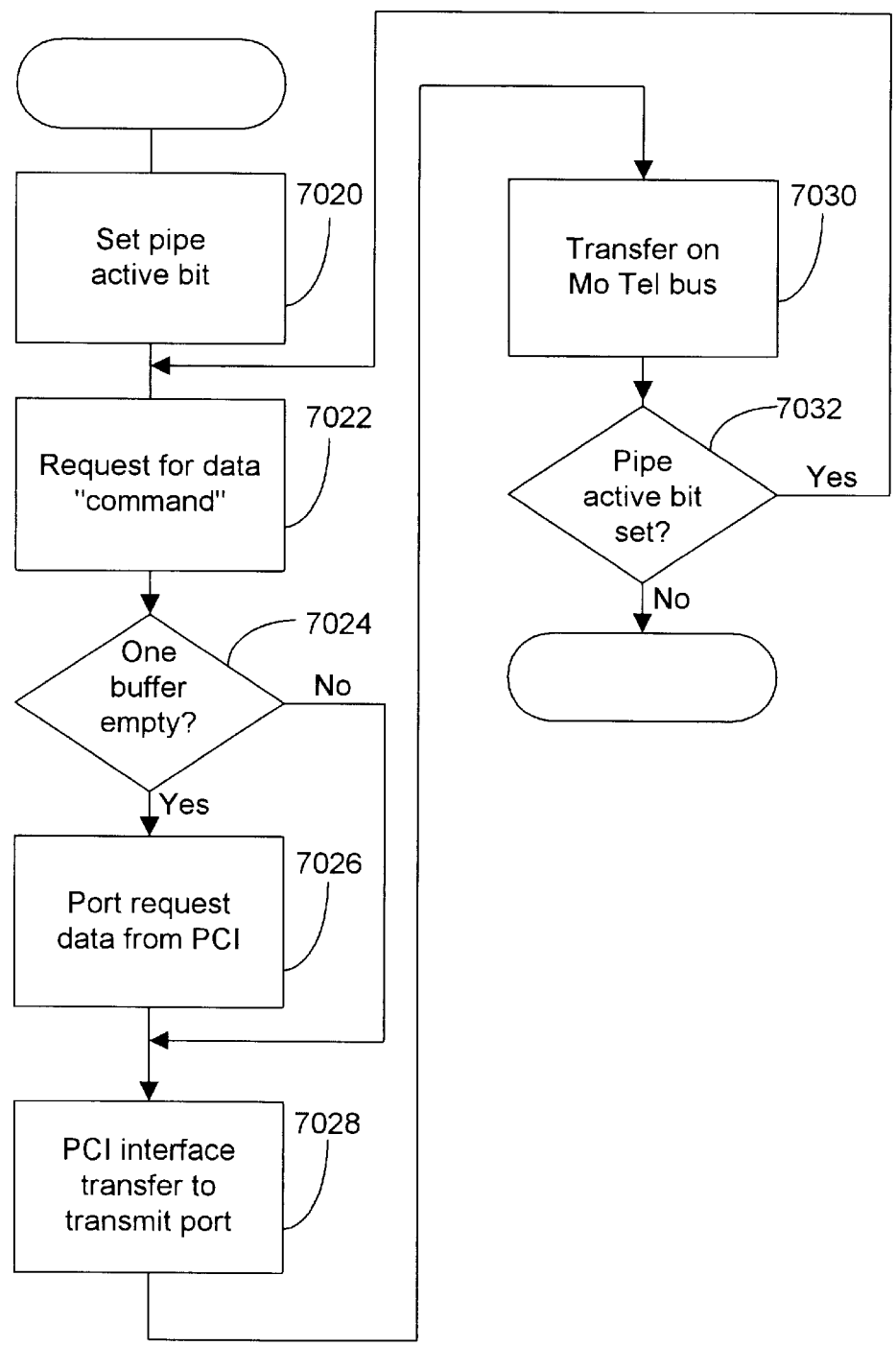
FIG. 32 is a flowchart illustrating the operation of the flow controlled pipe supported by the port illustrated in FIG. 31.

FIGS. 31 and 32: External Flow Control

As discussed above, transport pipes transferring isochronous data streams also operate in a flow-controlled mode. Turning now to FIG. 31, a block diagram is shown of the dual port structure required to support a transport pipe having external flow control. Port structure 7000 may, for example, be used to transmit modem data from system memory on the host PC 55 to the MoTel Bus device. Flow control commands are received from the MoTel Bus device. Data is transferred based on requests from the MoTel Bus device and, as such, the isochronous data rate is set by the MoTel Bus device. Port structure 7000 includes two page data buffer 7002*a*, 7002*b*, coupled to transmit data bus 1014 and internal address data bus 5008. Port state machine 7004 is coupled to internal address data bus 5008 and receive data bus 1010. Port state machine 7004 includes the destination port address register, the pipe active bit and receives the request for more data from the MoTel Bus device.

Turning now to FIG. 32, a flowchart is shown illustrating the operation of the flow-controlled pipe of FIG. 31. The source port in the bus bridge is activated to configure it for a transfer. This is preferably accomplished by setting the pipe active bit in the source port's port state machine (Step 7020).

The MoTel Bus target peripheral device then issues a "command" message over the MoTel bus to the MoTel Bus bridge. The command message identifies the address of a destination port on the MoTel bus device. In particular, the address byte of the address/data pair contains the port address of the receive port; the command/data bit is set to "command"; the data location field is set to "end"; and the data byte is set to "don't care" (Step 7022).

Once received, the address of the destination port is stored in a register of the bus bridge. If at least one of the pair of data buffers is empty (Step 7024), the source transmit port requests data from the PCI interface of the bus bridge (Step 7026). In response, the bus bridge PCI interface becomes the bus master of the PCI bus and fetches a block of data from system memory. Once received, the block of data, which is intended for the target peripheral device's destination port, is loaded into one-half of the bus bridge's transmit port buffer.

The PCI interface is programmed with the base address of the data in system memory and a transfer count in doublewords. The PCI interface calculates the PCI memory addresses by adding the base address to the current transfer count number. The PCI interface has two sets of base address and transfer count registers in order to allow the PC software to set up multiple buffers in memory.

The current count number is compared to the programmed transfer count. When the two are equal, an interrupt is generated to the host PC 55 and operation is switched over to the other base address transfer count pair. Once the block has been transferred to the bus bridge (Step 7028), the transmit port activates the transmit request line to the transmit state machine, which in turn, causes the data to be transferred on the MoTel Bus to the MoTel bus device as one or more address/data pairs (Step 7030). If the pipe active bit is still set (Step 7032), the transmit port suspends transmission until a new request for data from the MoTel Bus device is received.

More particularly, the MoTel bus device determines if the bus bridge buffer is substantially empty. In response to determining that the bus bridge buffer is substantially empty, the target peripheral device transmits a flow control command requesting more data. A receive port on the bus bridge receives the flow control command and the bus bridge retrieves more data in response to receiving the flow control command. The retrieved data are stored in the bus bridge source port for transmission as one or more address/data pairs to the MoTel bus target peripheral device.

Figure 33:
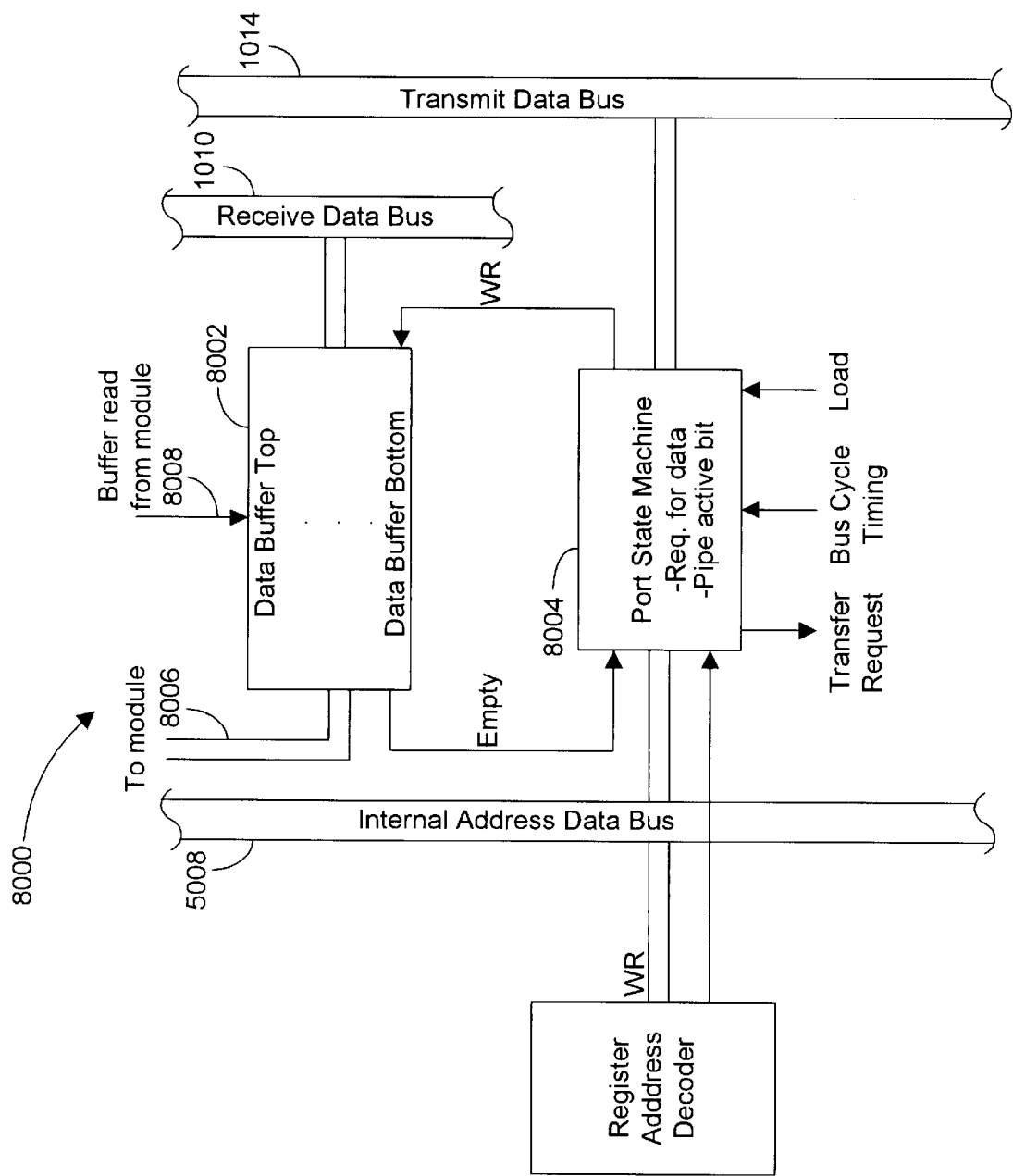
FIG. 33 is a block diagram of the port structure required to establish flow control transport pipes in which a bus bridge provides the flow control information to a MoTel bus device according to one embodiment of the present invention.
Figure 34:
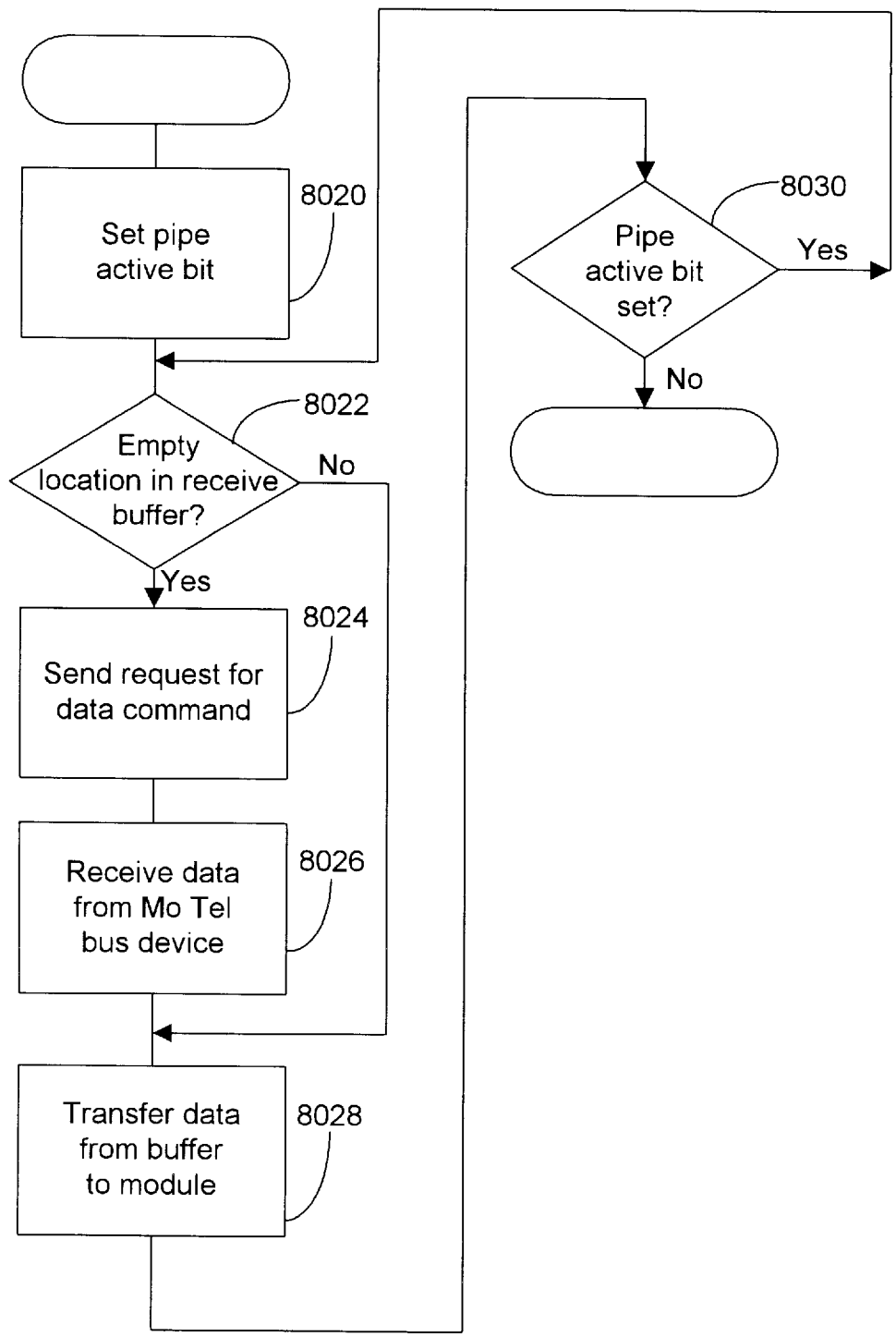
FIG. 34 is a block diagram of the data transfer process employing the port structure illustrated in FIG. 33.

FIGS. 33 and 34: Bus Bridge Provides Flow Control Information

Turning now to FIG. 33, a block diagram is shown of the port structure required to establish flow control transport pipes in which the bus bridge provides the flow control information to the MoTel Bus device. More particularly, port structure 8000 includes a data receive port and a data transmit port. A data buffer 8002 is coupled to receive data bus 1010 and is also coupled to send data to MoTel Bus bridge functional modules along line 8006. Such data can include data sent from the MoTel Bus bridge DSP to the multimedia codec. In a preferred embodiment, there are two identical ports, for left and right stereo channels. Such data can also include 3-D data from the MoTel Bus device to the synthesizer (in eight ports); and finally, modem data to the DAA via the MoTel codec. Port structure 8000 includes port state machine 8004, which includes a mechanism for reading the request for data command responding to the pipe active bit being set. Port state machine is coupled to transmit data bus 1014 and internal address data bus 5008.

Turning now to FIG. 34, a block diagram is shown of the data transfer process from a MoTel Bus source peripheral device to a module on board the MoTel Bus bridge using a MoTel Bus bridge-based flow control mechanism from the MoTel bus module (for example, the codec). The pipe is established by setting the pipe active bit (Step 8020). If there is an empty storage location in the receive buffer (Step 8022), the MoTel Bus bridge will send a Request for Data command to the MoTel Bus source peripheral device (Step 8024). The Request for Data command is preferably a single MoTel Bus cycle which contains the port address of the associated MoTel Bus bridge destination port programmed via the port address register in the port state machine.

The command data bit of the Request for Data command is set to "command," the data location field is set to "end", and the data byte is a "don't care". In order to ensure that the port is not continuously sending requests for data, a request is sent each time a data word is required (i.e. only one request for each data word). The Request for Data command may not be sent while the MoTel Bus device is turned off. Alternatively, the Request for Data command may be sent any time the MoTel codec reads the data buffer and the buffer is not full. Because the bus is faster than the codec data rate, the buffer should always appear full to the codec. If it is not, then a Request for Data command should be issued. The address and Request for Data Command are received into the target source port and stored in a register in the source port.

The MoTel Bus source peripheral device transmits the data as one or more address/data pairs to the MoTel Bus bridge (Step 8026). More particularly, the data are placed into the top half of the destination port's double buffer. The receive data has a sixteen bit format, with the least significant byte sent first and the most significant byte sent next.

Data are read out of the receive buffer bottom half by a MoTel codec on the bus bridge based on the MoTel codec's frame rate. If the MoTel bus bridge codec tries to read the buffer when the pipe is not active, it will read zeroes. If the codec tries to read an empty buffer while the pipe is active, it will get a duplicate of the last read value. Whenever the bus bridge determines that there is empty space in the buffer, the bus bridge sends a Request for Data flow control command, which is received by a corresponding receive port in the MoTel Bus source peripheral device. In response, the MoTel bus device transmits the requested data to the bus bridge destination port as one or more address/data pairs. However, because the interface is much faster than the MoTel codec data rate, the buffer should always appear full (Step 8028).

Modem data from the MoTel Bus device DSP to the DAA is in a sixteen-bit format as discussed above. However, data from the MoTel Bus device DSP to the multimedia codec can be in either eight-bit or sixteen-bit format. In this case, the buffer may be designed as four eight-bit locations. Otherwise, transfer of data proceeds as discussed above. Finally, 3-D audio data from the MoTel Bus device to the synthesizer may also be in either eight-bit or sixteen-bit format. Data is read from the bottom half receive buffer by the synthesizer based on its frame rate. In each of the three cases listed above, it is the responsibility of the MoTel Bus device DSP or functional unit interface module to ensure that the data is always available to be read.

The invention described in the above detailed is not intended to be limited to the specific form set forth herein, but on the contrary it is intended to cover such alternatives, modifications and equivalents as can be reasonably included within the spirit and scope of the invention as defined by the appended claims.

I claim:

1. A method for transferring data between a device and a bus bridge in a computer system, the computer system comprising a first bus, the bus bridge for coupling to the first bus and for interfacing to a second bus, a second bus coupled to the bus bridge, and a plurality of peripheral devices connected to the second bus, the method comprising:

activating a source port in the bus bridge to configure the source port in the bus bridge for a transfer;

the bus bridge receiving memory address and transfer size information from the first bus, wherein the receiving memory address and transfer size information includes storing the memory address and transfer size information in a register of the source port, wherein the memory address and transfer size information is indicative of a location and amount of data to be transmitted to a target peripheral device;

the bus bridge transmitting one or more command messages to a destination port of the target peripheral device, wherein the one or more command messages includes an address of the destination port and the memory address and transfer size information received from the first bus, wherein the transmitting is performed in response to storing the memory address and transfer size information in a buffer in the bus bridge;

the target peripheral device receiving the one or more command messages and executing an interrupt in response thereto;

the target peripheral device activating a data port in response to the executing an interrupt;

the source port in the bus bridge receiving data from the first bus into a buffer in the source port;

the source port in the bus bridge transferring one or more address/data pairs across the second bus to the data port of the peripheral device in response to the source port receiving the data into the buffer;

wherein the one or more address/data pairs each includes an address of the data port in the target peripheral device and the data received from the first bus.

2. The method of claim 1, wherein the activating a source port in the bus bridge to configure the source port in the bus bridge for a transfer comprises setting a pipe active bit in a register prior to receiving the memory address and transfer size information, wherein said setting the pipe active bit activates the register access source port.

3. The method of claim 2, wherein the transmitting one or more command messages comprises transmitting an address/data pair.

4. The method of claim 3, wherein the transmitting an address/data pair comprises transmitting an address byte and a data byte.

5. The method of claim 4, wherein the transmitting an address byte comprises transmitting the port address of the peripheral device destination port.

6. The method of claim 1, the transferring the one or more address/data pairs comprises transferring an address byte and a data byte at a time.

7. The method of claim 6, wherein the transferring an address byte comprises transferring transfer location information, the transfer location information identifying whether the data byte is the first byte in a transfer.

8. The method of claim 7, wherein the transferring an address byte comprises transferring transfer location information, the transfer location information identifying whether the data byte is the last byte in a transfer.

9. The method of claim 1, wherein the receiving data from the first bus comprises receiving data from a Peripheral Component Interconnect (PCI) bus.

10. A method for transferring data between a device and a bus bridge in a computer system, the computer system comprising a first bus, the bus bridge for coupling to the first bus and for interfacing to a second bus, a second bus coupled to the bus bridge, and a plurality of peripheral devices connected to the second bus, the method comprising:

activating a destination port in the bus bridge to configure the destination port in the bus bridge for a transfer;

the bus bridge receiving memory address and transfer size information, wherein the receiving memory address and transfer size information includes storing the memory address and transfer size information in a register of the destination port, wherein the memory address and transfer size information is indicative of a location and amount of data to be transmitted from a source peripheral device;

the bus bridge transmitting one or more command messages to a source port of the source peripheral device, wherein the one or more command messages includes an address of the destination port and the memory address and transfer size information, wherein the transmitting is performed in response to storing the memory address and transfer size information in a buffer in the bus bridge;

the source peripheral device receiving the one or more command messages and executing an interrupt in response thereto;

the source peripheral device activating a data port in response to the executing an interrupt;

the data port in the source peripheral device receiving data into a buffer;

the data port in the source peripheral device transferring one or more address/data pairs across the second bus to the destination port of the bus bridge in response to the source port receiving the data into the buffer;

wherein the one or more address/data pairs each includes an address of the destination port in the bus bridge and the data received.

11. The method of claim 10, wherein the activating a destination port in the bus bridge to configure the destination port in the bus bridge for a transfer comprises setting a pipe active bit in a register prior to receiving the memory address and transfer size information, wherein said setting the pipe active bit activates the register access source port.

12. The method of claim 11, wherein the transmitting one or more command messages comprises transmitting an address/data pair.

13. The method of claim 12, wherein the transmitting an address/data pair comprises transmitting an address byte and a data byte.

14. The method of claim 13, wherein the transmitting an address byte comprises transmitting the port address of the bus bridge destination port.

15. The method of claim 10, the transferring the one or more address/data pairs comprises transferring an address byte and a data byte at a time.

16. The method of claim 15, wherein the transferring an address byte comprises transferring transfer location information, the transfer location information identifying whether the data byte is the first byte in a transfer.

17. The method of claim 16, wherein the transferring an address byte comprises transferring transfer location information, the transfer location information identifying whether the data byte is the last byte in a transfer.

18. The method of claim 10, wherein the receiving data from the first bus comprises receiving data from a Peripheral Component Interconnect (PCI) bus.

19. A computer system comprising:

a first bus;

a bus bridge for coupling to the first bus;

a second bus coupled to the bus bridge; and a plurality of peripheral devices connected to the second bus; wherein the computer system further comprises:

means for activating a source port in the bus bridge to configure the source port in the bus bridge for a transfer;

means in the bus bridge for receiving memory address and transfer size information from the first bus, wherein the receiving memory address and transfer size information means includes means storing the memory address and transfer size information in a register of the source port, wherein the memory address and transfer size information is indicative of a location and amount of data to be transmitted to a target peripheral device;

means in the bus bridge for transmitting one or more command messages to a destination port of the target peripheral device, wherein the one or more command messages includes an address of the destination port and the memory address and transfer size information received from the first bus, wherein the transmitting is performed in response to storing the memory address and transfer size information in a buffer in the bus bridge;

means in the target peripheral device for receiving the one or more command messages and executing an interrupt in response thereto;

means in the target peripheral device for activating a data port in response to the executing an interrupt;

means in the source port in the bus bridge for receiving data from the first bus into a buffer in the source port;

means in the source port in the bus bridge for transferring one or more address/data pairs across the second bus to the data port of the peripheral device in response to the source port receiving the data into the buffer;

wherein the one or more address/data pairs each includes an address of the data port in the target peripheral device and the data received from the first bus.

20. A computer system comprising:

a first bus;

a bus bridge for coupling to the first bus;

a second bus coupled to the bus bridge; and a plurality of peripheral devices connected to the second bus; wherein the computer system further comprises:

means for activating a destination port in the bus bridge to configure the destination port in the bus bridge for a transfer;

means in the bus bridge for receiving memory address and transfer size information, wherein the receiving memory address and transfer size information means includes means for storing the memory address and transfer size information in a register of the destination port, wherein the memory address and transfer size information is indicative of a location and amount of data to be transmitted from a source peripheral device;

means in the bus bridge for transmitting one or more command messages to a source port of the source peripheral device, wherein the one or more command messages includes an address of the destination port and the memory address and transfer size information, wherein the transmitting is performed in response to storing the memory address and transfer size information in a buffer in the bus bridge;

means in the source peripheral device for receiving the one or more command messages and executing an interrupt in response thereto;

means in the source peripheral device for activating a data port in response to the executing an interrupt;

means in the data port in the source peripheral device for receiving data into a buffer;

means in the data port in the source peripheral device for transferring one or more address/data pairs across the second bus to the destination port of the bus bridge in response to the source port receiving the data into the buffer;

wherein the one or more address/data pairs each includes an address of the destination port in the bus bridge and the data received.

* * * * *